(12) United States Patent  
LeCompte

(10) Patent No.: US 7,762,048 B1
(45) Date of Patent: Jul. 27, 2010

(54) THERAPEUTIC HOOF BOOT

(76) Inventor: Catheleen B. LeCompte, 350 Bateman Rd., Barrington Hills, IL (US) 60010

( * ) Notice: Subject to any disclaimer, the term of this patent is extended or adjusted under 35 U.S.C. 154(b) by 292 days.

(21) Appl. No.: 11/888,084

(22) Filed: Jul. 31, 2007

Related U.S. Application Data

(63) Continuation-in-part of application No. 11/204,470, filed on Aug. 16, 2005, now abandoned.

(51) Int. Cl.
*B68B 7/00* (2006.01)
*B68C 5/00* (2006.01)

(52) U.S. Cl. .................................. 54/82; 168/2; 168/27
(58) Field of Classification Search .............. 54/82; 119/650, 654, 860, 856; 36/11; 168/2, 27
See application file for complete search history.

(56) References Cited

U.S. PATENT DOCUMENTS

| 70,035 | A | 10/1867 | Sloat |
| 230,155 | A | 7/1880 | Spence |
| 349,668 | A | 9/1886 | St. John |
| D26,832 | S | 3/1897 | Hirsch |
| 601,541 | A | 3/1898 | Anderson |
| 609,551 | A | 8/1898 | Lang |
| 1,039,002 | A | 9/1912 | Winston |
| 1,825,186 | A | 9/1931 | Harsem |
| 2,041,538 | A | 5/1936 | Gash et al. |
| 3,236,310 | A | 2/1966 | Quick |
| 3,686,561 | A | 12/1969 | Kulak |
| 4,189,004 | A | 2/1980 | Glass |
| 4,503,914 | A | 3/1985 | Voland |
| 5,129,461 | A | 7/1992 | Igrow |
| 5,176,221 | A | 1/1993 | Aprill |
| 5,588,288 | A | 12/1996 | Origgi et al. |
| 5,983,611 | A | 11/1999 | Smahl et al. |
| 6,381,930 | B1 * | 5/2002 | Clark et al. .................... 54/82 |
| 6,516,594 | B2 | 2/2003 | Clark et al. |
| 2003/0167739 | A1 | 9/2003 | Clark et al. |
| 2004/0134669 | A1 | 7/2004 | Kriesel et al. |

FOREIGN PATENT DOCUMENTS

EP 237380 A1 * 9/1987

OTHER PUBLICATIONS

Abstract of EP237380.*
http://www.equineperformanceproducts.com/easyboot.htm.
http://www.davismanufacturing.com/products/horse_boot.html.

* cited by examiner

*Primary Examiner*—Son T. Nguyen

(57) ABSTRACT

A hoof boot assembly enables a user to remedy a select hoof disorder, and comprises an outer hoof-enveloping casing and an inner cavity-filling core. The casing is constructed from an elastic material and the core is constructed from a viscoelastic material. The core is received in the casing such that when donned upon a hoof, the sole/frog cavity of the hoof negatively impresses the core. In other words, the boot assembly is outfitted upon a hoof such that the casing envelopes the hoof, and the core compressibly fills the hoof cavity thereof. The optional medicament is deliverable to a target treatment site via core compression for topically treating the site. The casing is elastically actuable and returnable during hoof loading/unloading, and the core is creep-compressible and creep-returnable during hoof loading/unloading.

20 Claims, 15 Drawing Sheets

THERAPEUTIC HOOF BOOT

PRIOR HISTORY

This application is a continuation-in-part patent application, which claims the benefit of U.S. patent application Ser. No. 11/204,470, filed in the United States Patent and Trademark Office on Aug. 16, 2005 now abandoned.

BACKGROUND OF THE INVENTION

1. Field of the Invention

The present invention generally relates to an equine hoof boot assembly for outfitting an equine hoof or similar other anatomical structure having a relatively hard, keratinized, but expandable outer wall with a relatively soft tissue-lined, wall-protected cavity. More particularly, the present invention relates to a boot for outfitting an equine hoof or structure of similar form and function with a primary goal being the therapeutic treatment thereof.

2. Description of the Prior Art

It is not uncommon for a horse to develop an abscess on any of its hooves. Common methods for remedying hoof abscesses include drilling a hole into the hoof which then must usually be packed and soaked. To soak a horse hoof, farriers often recommend that horse care takers purchase any number of hoof-soaking boots, such as the so-called "EZ" brand boot or the DAVIS brand boot. The primary problem with these types of boots is that they often irritate the coronary band, the growing band of the hoof. Horses then often develop a secondary infection, which secondary infection then requires further treatment(s).

Equines frequently stand in mud and human caretakers must often do the same. Human caretakers in such situations, however, often don their shoes with some type of prior art galosh or rubber as a means to protect their shoes. During such an episode, the author contemplated that if a horse hoof could be outfitted with a galosh or similar other overshoe or boot constructed and formed to be properly outfitted upon a horse hoof, the use of awkward, clumsy soaking boots that often lead to secondary infections of the coronary band could be eliminated. Notably, secondary infections of the coronary band can lead to malformations in the hoof as it grows or dynamically develops. Further, it is notable that the coronary band is essentially that boundary between soft tissue and hard tissue, similar to the cuticle on a human phalange. Just as an injured cuticle results in the malformation or other disruption to the human fingernail, so too does an injured coronary band result in disruption to the hoof wall.

It is further noted that, as donned upon many horses, the visual appearance of a typical therapeutic hoof boot is often less than desirable. If the aforementioned horse galosh or horse boot could be made from inexpensive materials, but structured so as to more effectually outfit a horse hoof, any number of color combinations could be easily incorporated into the design as a means to enhance the visual appearance of the therapeutic hoof boot assembly or otherwise ornamentally outfit the horse hoof. For example, show horses are often ornamented with various riding colors. If a user were desirous of outfitting her show horse with hot pink colors, hot pink hoof boots could be provided for both ornamenting the horse's hooves as well as providing therapeutic treatment therefor, if ever required. A search into the state of the art reveals, however, that a number of articles attachable to an equine hoof are known in the prior art. Some of the more pertinent prior art relating to equine hoof boots and the like is briefly described, hereinafter.

U.S. Pat. No. 601,541 ('541 patent), which issued to Anderson, discloses a Horseshoe. The '541 patent teaches a rubber base ring having a central open portion and recessed on its upper, rear portion for the reception of the frog of the hoof, and a slitted rubber hoof band or envelope provided with fastening means. Notably, the '541 patent teaches an elastic hoof-receiving/protecting device sized and shaped to lie in inferior adjacency to the coronal band of the distal portion of an equine limb.

U.S. Pat. No. 609,551 ('551 patent), which issued to Lang, discloses a Non-Slipping Horseshoe. The '551 patent teaches an adjustable horse shoe or boot having a sole consisting of a sheet of flexible material provided with a slot or recess which extends forwardly from the rear edge of the sole and terminates at a distance from the toe or front edge thereof, dividing the sole into two adjustable sections which are connected by the unrecessed front portion of the sole and which can be expanded or contracted for varying the size of the horse shoe and an upper extending upwardly from the edge of said sole. Notably, the '551 patent teaches an elastic hoof-receiving/protecting device sized and shaped to lie in inferior adjacency to the coronal band of the distal portion of an equine limb.

U.S. Pat. No. 2,041,538 ('538 patent), which issued to Gash et al., discloses a Horseshoe. The '538 patent teaches a horseshoe comprises of a resilient material such as rubber and is either molded or shaped so that on being attached to the hoof of the horse by any suitable means the resilient material conforms to the external contour of the hoof and is retained in position thereon without fastening means formed separately from the shoe. The upper end of the horseshoe terminates below the fetlock of the horse. U.S. Pat. No. 3,236,310 ('310 patent), which issued to Quick, discloses a Self-Fitting Boot Type Horse Shoe. The '310 patent teaches a hoof boot that is form-fitted to the hoof of a horse by heat shrinking the materials used. Notably, the '310 patent teaches an elastic hoof-receiving/protecting device sized and shaped to lie in inferior adjacency to the coronal band of the distal portion of an equine limb.

U.S. Pat. No. 5,983,611 ('611 patent), which issued to Smahl et al., discloses a Horse Shoe Cassette System. The '611 patent teaches a horse shoe cassette system for an animal's hoof. The cassette system comprises a plurality of hollow holders that are screwed into the hoof. Each holder has a threaded outside surface and a threaded inside opening defined therein. A flexible covering, of a general hollow ungulate shape to fit an ungulate's hoof, has a bottom plate that includes a first opening defined therein. A horse shoe is attached to the bottom plate of the flexible covering and the horse shoe has a second opening. A threaded screw member extends through the first and second openings and is screwed into the threaded inside opening of the holder disposed in the hoof. Noting the flexibility in the device of the '611 patent, it may be further noted that U.S. Pat. Nos. 4,189,004; 4,503, 914; 5,588,288; 6,516,594; and United States Patent Application Publication No. 2003/0167739 all further teach flexible hoof-receiving or hoof-protecting devices of various types.

It may be seen from a further review of the above-referenced disclosures and other prior art generally known to exist that the prior art does not teach a low cost hoof boot for outfitting an equine hoof or similar other anatomical structure, which hoof boot comprises an elastic skin or casing and a medicated viscoelastic core or inner medium for periodically filling the dynamically-changing solar concavity of the equine hoof via creep action during cyclic loading. The prior art thus perceives a need for a low cost hoof boot or galosh of the foregoing type as a means to outfit and selectively treat a hoof.

SUMMARY OF THE INVENTION

Accordingly, it is an object of the present invention to provide certain boot constructions for outfitting an equine hoof as a means to treat a select equine hoof disorder or injury, as may be required. To achieve these and other readily apparent objectives, the present invention provides an equine hoof boot assembly for treating an equine hoof, which assembly essentially comprises an outer hoof-enveloping casing, an inner cavity-filling core, and a medicament. The casing is preferably constructed from an elastic material and the core is preferably constructed from a viscoelastic material.

A material may be described as having elastic properties if it instantaneously deforms under stress (i.e. an applied force), and instantaneously returns to its original shape when the stress is removed. The amount of deformation is often referred to as the strain. A (fluid) material may be described as having viscous properties if it exhibits a resistance to deformation under a shear stress. A material may be described as "viscoelastic" if it exhibits both elastic and viscous characteristics when undergoing deformation.

In other words, elastic materials strain instantaneously when stretched and just as quickly return to their original state once the stress is removed. Viscous materials, like honey, resist shear flow and strain linearly with time when a stress or force is applied. Viscoelastic materials have elements of both of these properties and, as such, exhibit time dependent strain. Whereas elasticity is usually the result of bond stretching along crystallographic planes in an ordered solid, viscoelasticity is the result of the diffusion of atoms or molecules inside of a material, a process which is time dependent.

The viscoelastic material and/or core medium of the present invention is received within the casing or elastic shell. The medicament is applied to, or otherwise absorbed by, the core and dispensable or applicable therefrom via compression of the core. The boot assembly is outfittable upon an equine hoof such that the casing envelopes the equine hoof, the core compressibly fills, or is packed into, a hoof cavity of the equine hoof, and the medicament topically treats select or targeted cavity structure of the hoof cavity, such as an abscess or similar other malady.

Notably, an equine hoof is not a rigid structure, but elastic and flexible. When loaded during a step under the weight of an animal, the hoof physiologically changes its shape. This is a result of solar concavity or generally arched shape of the lateral profile of the hoof walls and sole, which has a variable depth, in the region of 1-1.5 cm. When an unloaded hoof touches a firm underlying surface, there is only contact at the toe and heels (active contact). A loaded hoof has a much greater area of ground contact (passive contact), covering the lower wall edge, most of the sole, bars and frog. Active contact areas may be seen as slightly protruding spots in the walls and in the callused sole.

The shape changes in a loaded hoof are complex. The plantar arch flattens, the solar concavity generally decreases in depth and the heels spread. The hoof diameter increases to a "dilated" configuration and the pedal bone or third phalanx drops marginally into the hoof capsule. Evidence suggests that a depression takes place during this motion, with blood pooling mainly into the wall's corium. When unloaded, the hoof restores its "contracted" configuration. During contraction, blood pressure raises, squeezing or pumping blood out. Further, there is a secondary pumping action, with the flexion of the foot, as it is raised. The hoof mechanism thus ensures an effective blood circulation into the hoof.

When outfitted upon the hoof mechanism, the casing of the present invention is elastically actuable (including tensile and compressive stresses) during weight compression or loading of the hoof primarily in response to increases in the hoof diameter, and secondarily in response to compressive forces in the material as sandwiched intermediate the hoof and the underlying surface. Further, the core is viscoelastically compressed during weight compression or loading as the third phalanx drops marginally into the hoof capsule. The medicament-bearing core topically treats the hoof disorder or injury of the hoof during weight compression or loading. During weight removal from or unloading of the hoof, the casing is elastically returnable via restorative forces inherent in the material, which forces aid or quicken the contraction of the hoof to the relaxed, contracted configuration.

Notably, the core exhibits creep or creep-returns during unloading of the hoof. A viscoelastic material may be characterized by way of its response to a suddenly applied uniform distribution of surface tractions on a specimen. By way of illustration, consider an elastic material. When subjected to an applied loading state and held constant thereafter, an elastic material responds instantaneously with a state of deformation which remains constant. A viscous fluid, however, responds to a suddenly applied state of uniform shear stress by a steady flow process. Viscoelastic materials, however, instantaneously deform under a suddenly applied maintained state of uniform stress, which is followed by a flow process which may or may not be limited in magnitude as time elapses.

A material which responds in this manner is said to exhibit both an instantaneous elasticity effect and creep characteristics. This behavior is not properly describable by either an elasticity theory or a viscosity theory but combines features of each. This more general type of material possesses a characteristic which can be descriptively referred to as a memory effect. That is, the material response is not only determined by the current state of stress but is also determined by all past states of stress and, in a general sense, the material has a memory for all past states of stress. When the load or weight is removed from the core, the applied stress is removed, and the core creeps back or creep-returns to its original cavity-filling or cavity-packing configuration.

During compression or loading, the medicament is dispensed from, or otherwise applied by the core to a select or targeted cavity structure for treating the structure. During unloading the coated structure experiences a period of exposure to air within the hoof cavity as the delayed, non-elastic response of the creep-returning viscoelastic core may allow. The medicament is thus also exposed to cavity-located air when the cavity-filling core is creep-returned to a cavity-filling configuration. The medicament may preferably comprise a volatile ingredient that is readily vaporizable into the cavity-located air for forming an ambient therapeutic environment for further treating the target treatment area.

Other objects of the present invention, as well as particular features, elements, and advantages thereof, will be elucidated or become apparent from, the following description and the accompanying drawing figures.

BRIEF DESCRIPTION OF THE DRAWINGS

Other features of my invention will become more evident from a consideration of the following brief description of patent drawings.

DETAILED DESCRIPTION OF THE PREFERRED EMBODIMENT

As stated above, this application is a continuation-in-part patent application, which claims the benefit of pending U.S. patent application Ser. No. 11/204,470, filed in the United States Patent and Trademark Office on Aug. 16, 2005, now published in U.S. Patent Application Publication No. 2007/0039289 (the '289 publication). The specifications set forth in the '289 publication are hereby incorporated by reference thereto insofar as the teachings and disclosures therein presented support the subject matter that follows. This specification presents or references certain select portions of the '289 publication as a means to highlight some of the key overlapping concepts between the '289 publication and the current specification.

Figure 1:
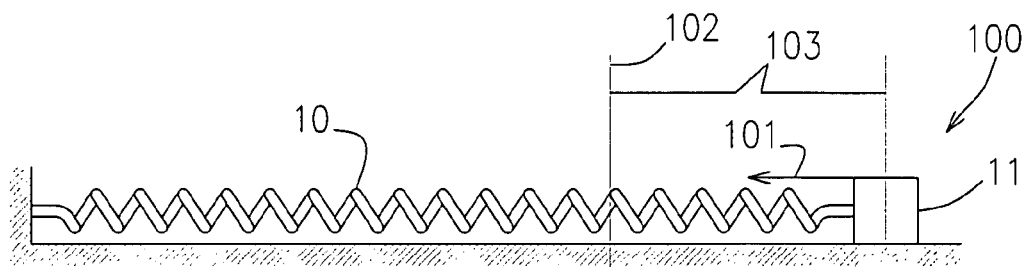
FIG. 1 is a first schematic depiction of a spring-block assembly in which the spring is exerting a return force on the block proportional to the block's tensioned or stretched displacement from an equilibrium position of the assembly.
Figure 2:
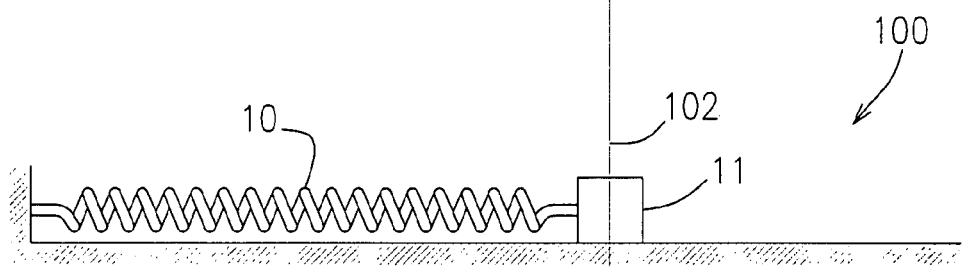
FIG. 2 is a second schematic depiction of a spring-block assembly in which the spring and block are at the relaxed equilibrium position of the assembly.
Figure 3:
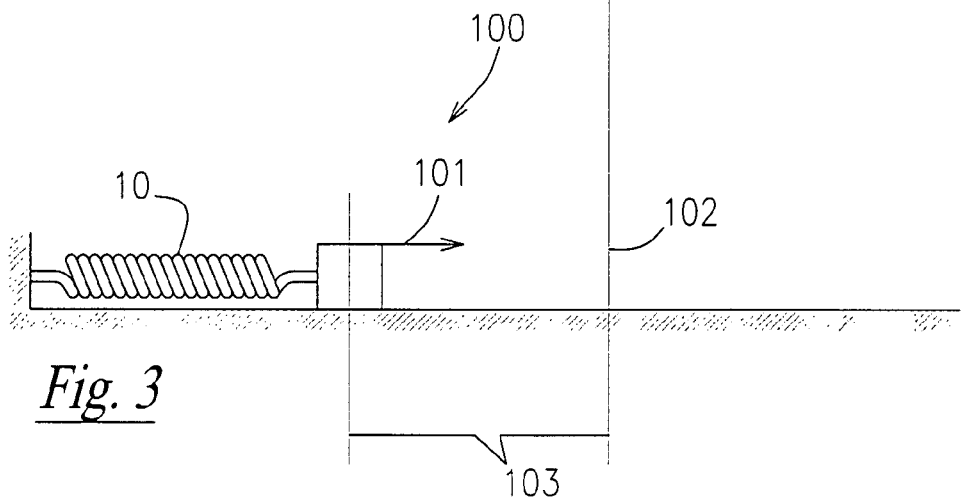
FIG. 3 is a third schematic depiction of a spring-block assembly in which the spring is exerting a return force on the block proportional to the block's compressed displacement from the equilibrium position of the assembly.

Turning then to the drawings of this specification, the readier may consider the block-spring system 100 schematically depicted in FIGS. 1-3. According to classical physical principles, the force 101 exerted by the spring 10 on the block 11 varies with the displacement 103 of the block 11 from the relaxed equilibrium position 102. This illustrated relationship may be written as:

$$F = -k \cdot x$$

(otherwise known as Hooke's Law), where "F" is the restoring spring force 101, "k" is an effective spring or force constant, and "x" is the magnitude of the displacement 103 from the relaxed equilibrium position 102. The negative sign indicates that the force 101 acts in a direction opposite the direction of displacement 103. When the displacement 103 is positive as may be exhibited with the stretched spring 10 in FIG. 1, the restoring spring force 101 is directed to the left and when the displacement 103 is negative as may be exhibited with the compressed spring 10 depicted in FIG. 3, the spring force 101 is directed to the right. It then follows that when the displacement 103 from the equilibrium position 102 is zero (i.e. the natural or relaxed length of the spring 10), the restoring force 101 is zero as generally depicted in FIG. 2.

From a physical perspective, Hooke's law of elasticity is an approximation stating that the amount by which a material body is deformed (i.e. the strain) is linearly related to the force causing the deformation (i.e. the stress). Materials for which Hooke's law is a useful approximation are sometimes known as linear-elastic materials and are often modeled by a spring such as the spring 10 illustrated in FIGS. 1-3. Objects that quickly or instantaneously regain their original shape after being deformed by a stress, with the molecules or atoms of their material returning to the initial state of stable equilibrium, are generally governed by Hooke's law.

Strictly speaking, Hooke's law only holds for some materials under certain loading conditions. Steel, for example, exhibits linear-elastic behavior for stresses below the yield strength and thus Hooke's law is valid for steel throughout its elastic range. For some other materials, however, such as aluminum, Hooke's law is only valid for a portion of the elastic range. For aluminum and similar other materials, a proportional limit stress is defined, below which the errors associated with the linear approximation are negligible.

In most elastic materials, such as metals used in springs, the elastic behavior is caused by bond distortions. In other words, when a force is applied, bond lengths deviate from the (minimum energy) equilibrium, and strain energy is stored electrostatically. Rubber, perhaps the most common elastic material that comes to mind, is often assumed to behave in the same way, but it turns out this is a poor description. Rubber is a curious material because, unlike metals, strain energy is stored thermally, as well as electrostatically.

In its relaxed state rubber consists of entangled, spaghetti-like polymer chains that are occasionally interlinked. Between a pair of links each monomer can rotate freely about its neighbor. This gives each section of chain leeway to assume a large number of geometries, very much akin to a loose rope attached to a pair of fixed points. At room temperature rubber stores enough kinetic energy so that each section of chain oscillates chaotically, as if the piece of rope cited in the foregoing example were being shaken violently.

When rubber is stretched, however, the "loose pieces of rope" are placed under tension and are thus no longer able to oscillate. Their kinetic energy is given off as excess heat. The entropy of the material decreases when going from the relaxed to the stretched state, and increases during relaxation. This change in entropy can also be explained by the fact that a tight section of chain can fold in fewer ways than a loose section of chain, at a given temperature.

Relaxation of a rubber otherwise under tension is thus driven by an increase in entropy, and the force experienced is not purely electrostatic; rather it is primarily a result of the thermal energy of the material being converted to kinetic energy. Rubber relaxation is endothermic and the material undergoes adiabatic cooling during contraction, which may be detected by placing thermally sensitive measurement means in contact with a relaxing rubber material (such as one's lips against a relaxing rubber band). During relaxation the material becomes noticeably cooler.

Stretching of a rubber material is in some ways equivalent to the compression of an ideal gas, and relaxation of a rubber material is in some ways equivalent to expansion of an ideal gas. It is thus noted that a compressed gas also exhibits certain "elastic" properties. Despite the counterintuitive notion that may come to mind, a rubber material in tension, if viewed one dimensionally, is akin to gas compression insofar as the stretched material exhibits a reduction in space available to each section of the spaghetti-like polymer chain(s) (i.e. all those loose ropes being pulled taught collectively occupy less space).

Invoking the theory of rubber elasticity, one may thus consider a polymer chain in a cross-linked network as an entropic spring. When the chain is stretched, the entropy is reduced by a large margin because there are fewer conformations available. Therefore, there is a restoring force, which causes the polymer chain to return to its equilibrium or relaxed, unstretched state, such as a high entropy random coil configuration, once the external force is removed. This is one explanation for why rubber bands return to their original relaxed equilibrium state when a load is removed.

By way of comparison, a viscous (fluid) material (often modeled by a dashpot) exhibits a resistance to deformation under shear stress. A material's viscosity is commonly perceived as its thickness, resistance to flow, or a measure of fluid friction. Whereas water may be said to be "thin", oil or molasses may be said to be "thick", the latter having a relatively higher viscosity. Materials for which both their viscosity and their elasticity are important in a particular range of deformation and deformation rate are referred to as being viscoelastic. In other words, viscoelastic materials may be said to exhibit both viscous properties and elastic properties.

In this last regard, it is noted that purely elastic materials have stress and strain in phase, so that the response of one caused by the other is immediate, and that with purely viscous materials, strain lags stress by a 90 degree phase lag. Viscoelastic materials, by contrast, exhibit behavior somewhere in the middle of these two types of materials, exhibiting some lag in strain in response to stress. Though the reasons for these behaviors are beyond the scope of these specifications, elasticity is usually the result of bond stretching along crystallographic planes in an ordered solid, while viscoelasticity is the result of the diffusion of atoms or molecules inside of an amorphous material.

Figure 4:
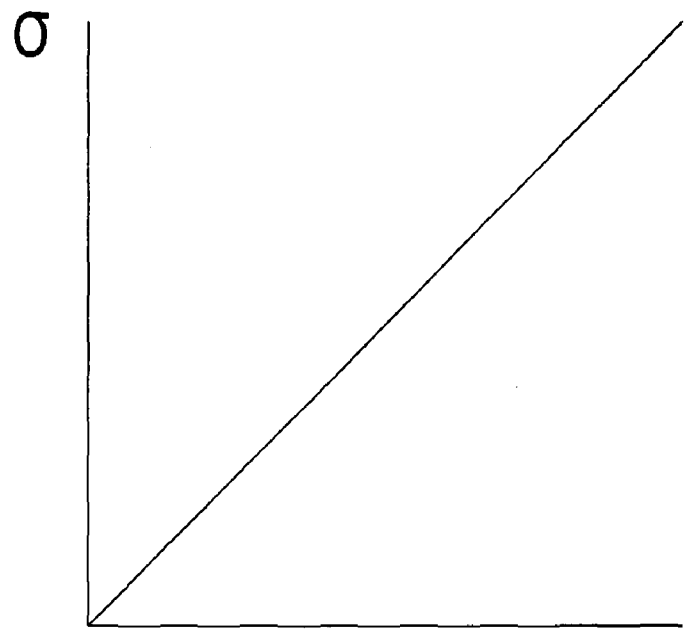
FIG. 4 is a graphical depiction of stress (σ) as a function of strain (ε) for an elastic material, showing the linear relation therebetween.
Figure 5:
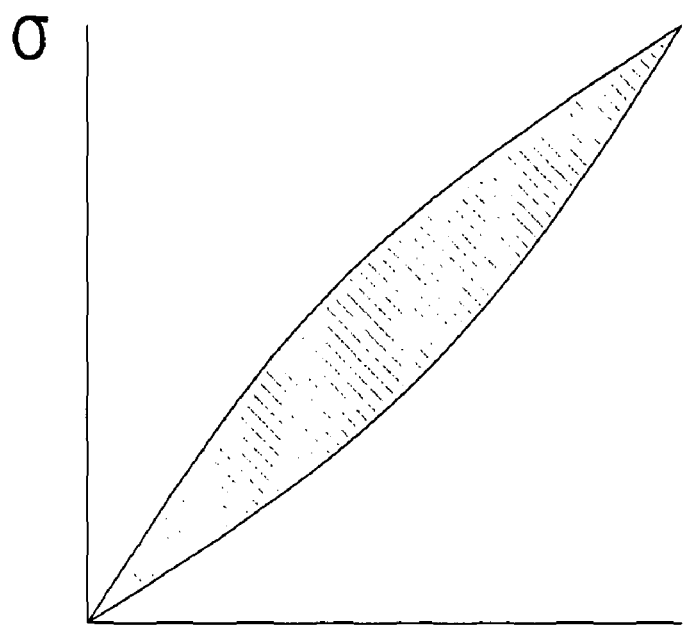
FIG. 5 is a graphical depiction of stress (σ) as a function of strain (ε) for a viscoelastic material, showing a hysteresis loop exhibited during a loading/unloading cycle.

As stated above, a viscoelastic substance has an elastic component and a viscous component unlike purely elastic materials. The viscosity of a viscoelastic substance gives the substance a strain rate dependent on time. Whereas purely elastic materials exhibit a linear stress ($\sigma$) versus strain ($\epsilon$) dependence and do not dissipate energy (heat) when a load is applied and removed (as generally depicted in FIG. 4), a viscoelastic substance will dissipate energy (heat) when a load is applied, then removed. In other words, hysteresis is observed in the stress ($\sigma$)-strain ($\epsilon$) curve, with the area of the loop being equal to the energy lost (dissipated heat) during the loading cycle as generally depicted in FIG. 5.

As alluded to above, viscoelasticity is a molecular rearrangement. When a stress is applied to a polymeric type viscoelastic material, portions of the entangled long polymer chains alter their positions. This movement or rearrangement in response to the stress is called creep. Polymers remain a solid material even when these parts of their chains are rearranging in order to accompany the stress, and as this occurs, it creates a back stress in the material. When the back stress is the same magnitude as the applied stress, the material no longer creeps. When the original stress is taken away, the accumulated back stresses will cause the polymer to return to its original form. The return capability has led many to describe polymeric viscoelastic materials to have memory. The fact that viscoelastic materials exhibit creep behavior gives rise to the prefix "visco-", and the fact that viscoelastic material fully recovers gives rise to the suffix "-elasticity".

Figure 6:
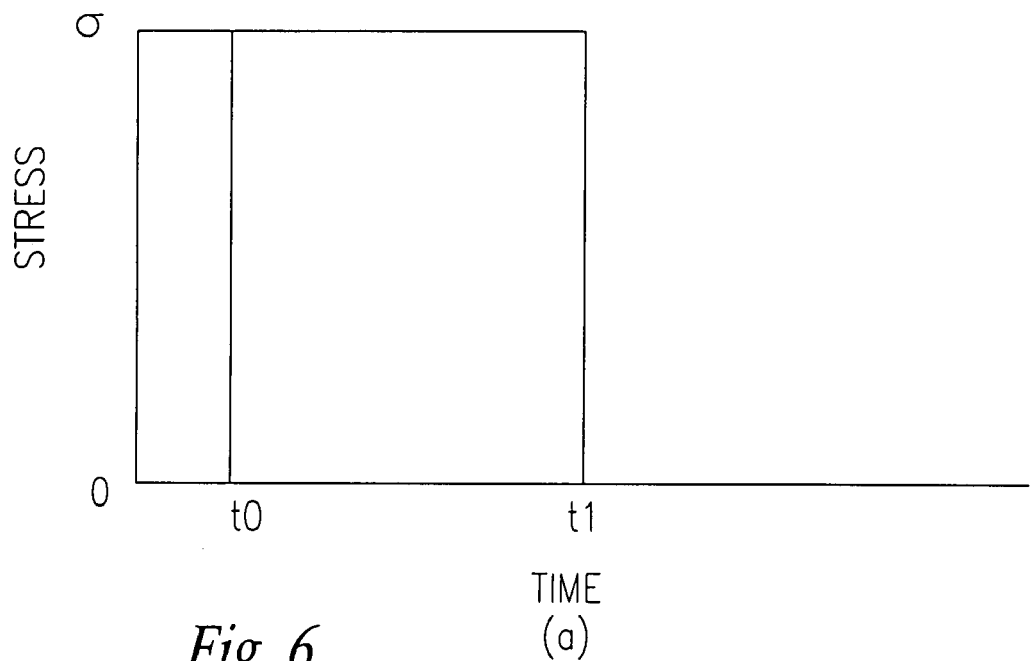
FIG. 6 is a graphical depiction of stress as a function of time for a viscoelastic material showing a constant stress over time.
Figure 7:
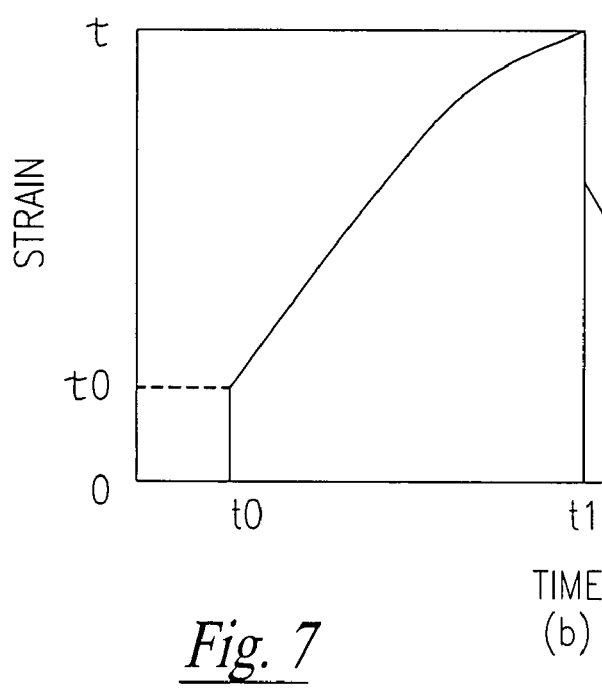
FIG. 7 is a graphical depiction of strain as a function of time for a viscoelastic material showing time-dependent strain.

Referring then to FIGS. 6 and 7, it may be understood that when viscoelastic materials are subjected to a step constant stress, the materials experience a time-dependent increase in strain described above as creep behavior. At time $t_0$, a viscoelastic material is loaded with a constant stress that is maintained for a period of time. The material responds to the stress with a strain that may increase until the material ultimately fails. When the stress is maintained for a shorter time period, however, the material undergoes an initial strain until a time $t_1$, after which the strain immediately decreases (discontinuity) then gradually decreases at times $t>t_1$ to a residual strain. This latter behavior can be eyeball confirmed by pressing into a viscoelastic material with one's finger and watching the material slowly return to its original relaxed configuration.

Viscoelastic materials, such as amorphous polymers, semi-crystalline polymers, and biopolymers, can be modeled diagrammatically (and symbolically) in order to determine their stress or strain interactions as well as their temporal dependencies. These models, which include the so-called "Maxwell", "Kelvin-Voigt", "Standard Linear Solid", and "Maxwell-Weichert" models, may be used to reasonably predict a viscoelastic material's response under different loading conditions. Exhibiting both elastic and viscous attributes, viscoelastic behavior may be modeled with various combinations of springs (elastic components) and dashpots (viscous component), respectively. Each model differs in the arrangement of these elements, and all of these viscoelastic models can be equivalently modeled as electrical circuits. The elastic modulus of a spring is analogous to a circuit's resistance and the viscosity of a dashpot to a capacitor, for example.

The elastic components, as previously mentioned, can be modeled as springs according to Hooke's law as generally depicted in FIGS. 1-3. The viscous components can be modeled as dashpots 12 such that the stress-strain rate relationship can be given as, $$\sigma = \eta (d\epsilon/dt)$$

where "$\sigma$" is the stress, "$\eta$" is the viscosity of the material, and "$d\epsilon/dt$" is the time derivative of strain.

To keep the concepts simplified, first consider a high stress state/short time period scenario. In this scenario, the time derivative components of the stress-strain relationship dominate. A dashpot resists changes in length, and in a high stress state it can be approximated as a rigid rod. Since a rigid rod cannot be stretched past its original length, negligible strain is added to the system. Conversely, for low stress states/longer time periods, the time derivative components are negligible and the dashpot can be effectively removed from the system effecting an "open" circuit. As a result, only the spring connected in parallel to the dashpot will contribute to the total strain in the system.

Figure 8:
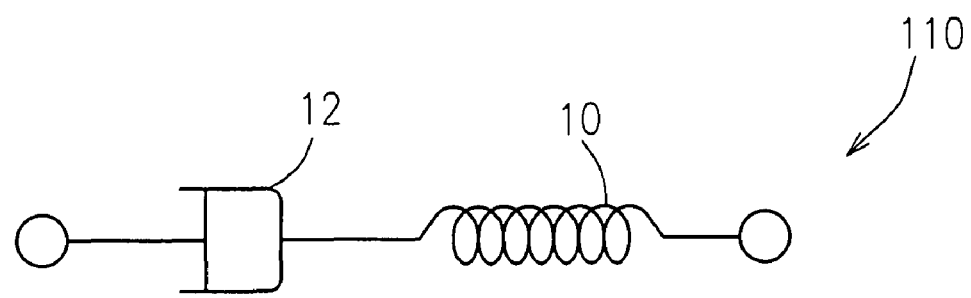
FIG. 8 is a schematic depiction of the so-called Maxwell model for viscoelasticity, showing a dashpot element in series with a spring element.
Figure 25:
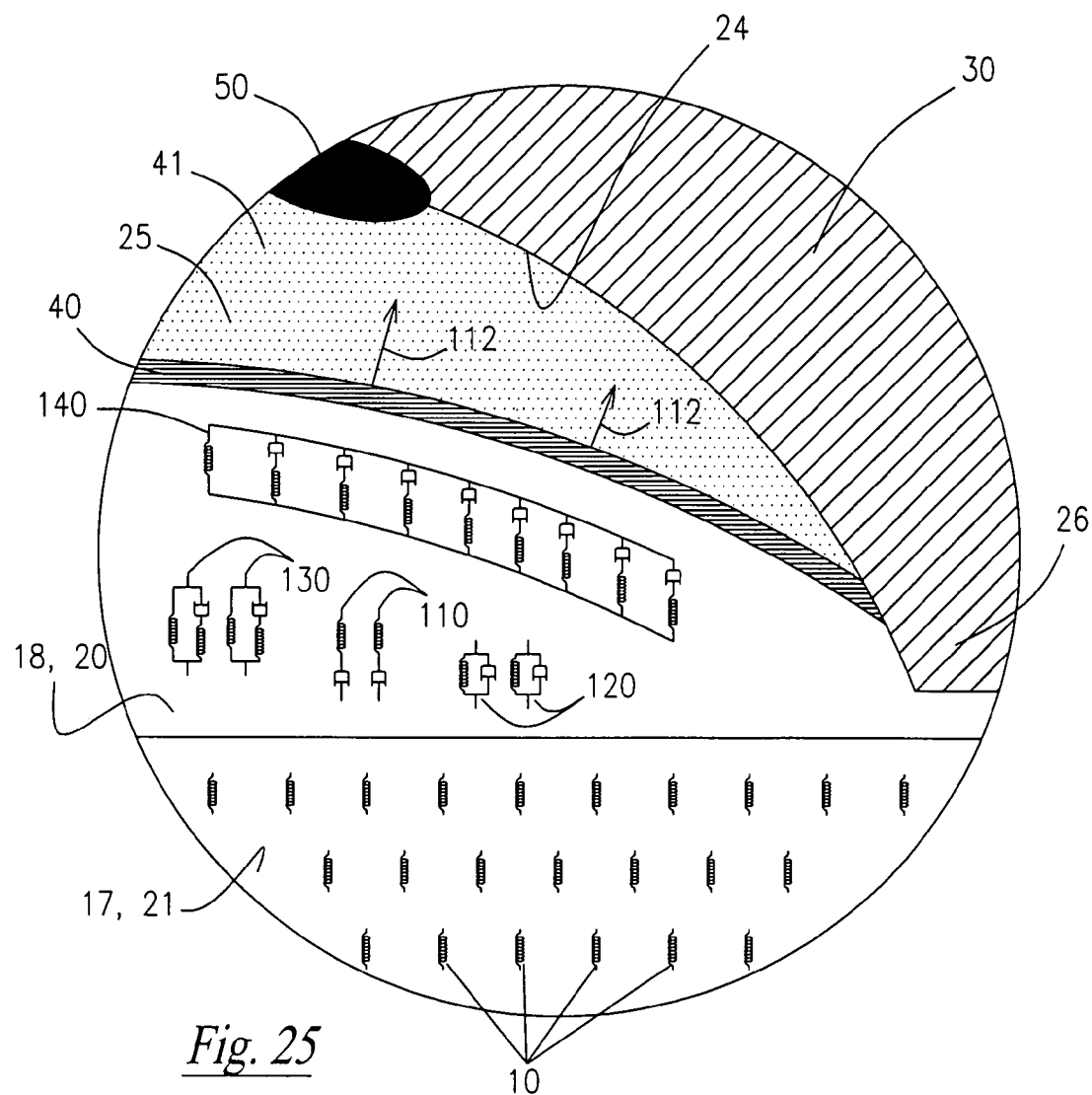
FIG. 25 is an enlarged sectional view as taken from FIG. 24 schematically depicting from the bottom layer to the top layer: (1) spring models representative of the elastic casing, (2) various viscoelastic models representative of the viscoelastic core, (3) a layer of medicament, an ingredient-laden air pocket, (4) a target treatment site, and (5) soft hoof tissue adjacent the upper boundary of the hoof cavity.

The so-called Maxwell model 110 is generally and schematically depicted in FIGS. 8 and 25. It may be seen from an inspection of the noted figures that the Maxwell model 110 can be represented by a purely viscous damper 12 and a purely elastic spring 10 connected in series. The Maxwell model 110 represents a liquid (able to have irreversible deformations) with some additional reversible (elastic) deformations. If a material is placed under a constant strain, the stresses in the material gradually relax, and if a constant stress is placed upon a material, the strain in the material has two components as per the Maxwell model 110. First, an elastic component occurs instantaneously, corresponding to the spring 10, and relaxes immediately upon release of the stress. The second is a viscous component that grows with time as long as the stress is applied. The Maxwell model 110 generally predicts that stress decays exponentially with time, which is accurate for most polymers.

Figure 9:
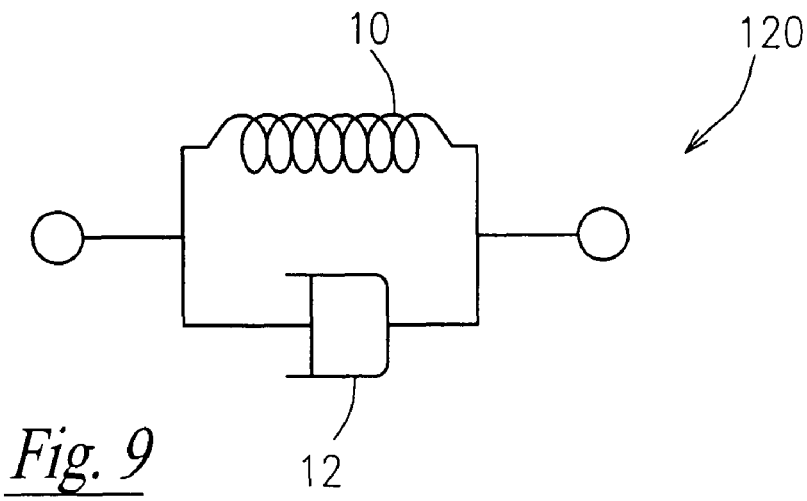
FIG. 9 is a schematic depiction of the so-called Kelvin-Voigt model for viscoelasticity, showing a dashpot element in parallel with a spring element.

The Kelvin-Voigt model 120 is generally and schematically depicted in FIGS. 9 and 25. It may be seen from an inspection of the figures that model 120 consists of a dashpot 12 and spring 10 connected in parallel. Model 120 is generally used to explain the stress relaxation behaviors of polymers, and represents a solid undergoing reversible, viscoelastic strain. Upon application of a constant stress, the material deforms at a decreasing rate, asymptotically approaching the steady-state strain. When the stress is released, the material gradually relaxes to its un-deformed original state.

Figure 10:
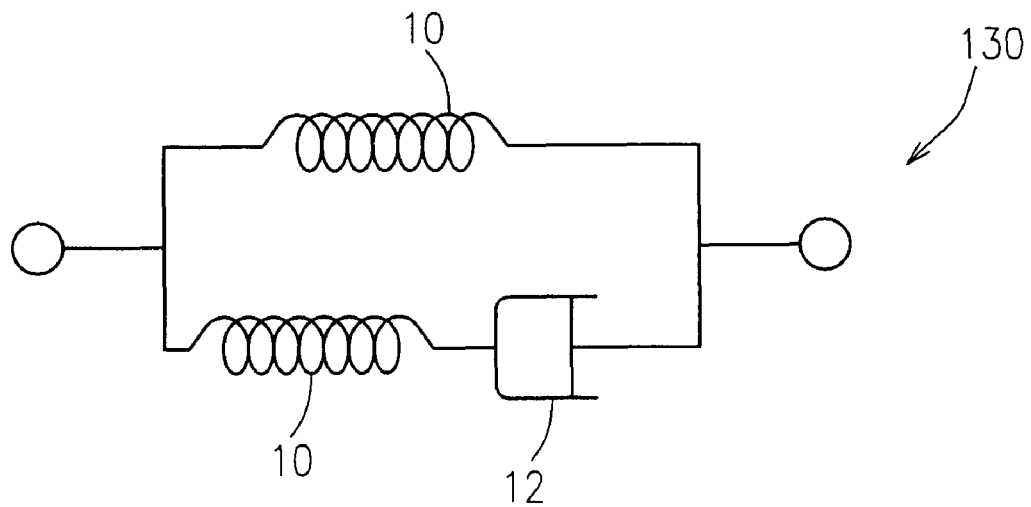
FIG. 10 is a schematic depiction of the so-called Standard Linear Solid model for viscoelasticity, showing a spring element in parallel with the Maxwell model otherwise depicted in FIG. 8.

The Standard Linear Solid model 130 is generally and schematically depicted in FIGS. 10 and 25. The Standard Linear Solid model 130 effectively combines the Maxwell model 110 (a spring 10 and dashpot 12 in series) and a spring 10 in parallel. In other words, the material is thus modeled as a spring 10 and a dashpot 12 in series with each other, both of which are in parallel with a lone spring 10. Under a constant stress, the modeled material will instantaneously deform to some strain, which is the elastic portion of the strain, and after that it will continue to deform and asymptotically approach a steady-state strain. This last portion is the viscous part of the strain. The Standard Linear Solid model 130 is generally considered more accurate than either the Maxwell model 110 or Kelvin-Voigt model 120 in predicting material responses.

Figure 11:
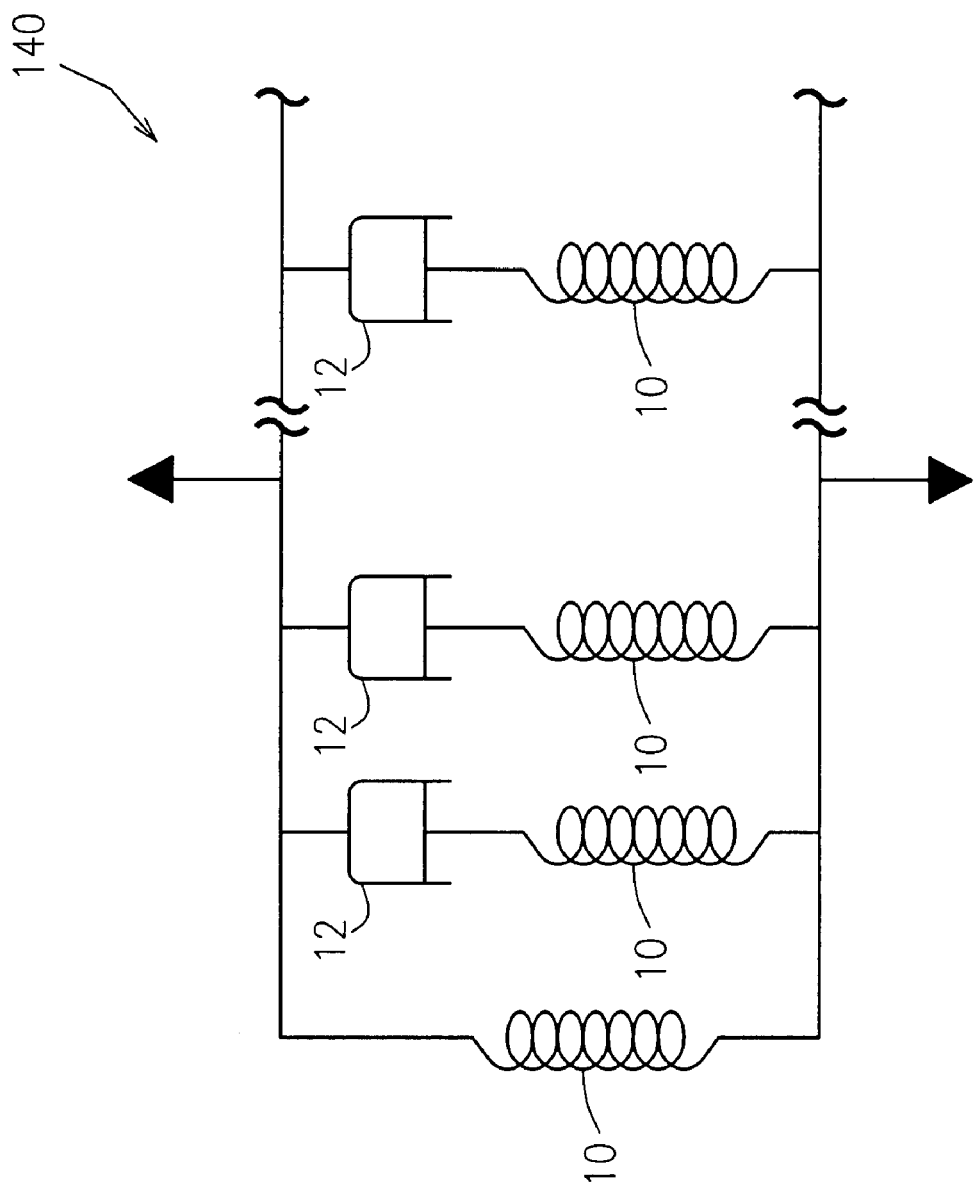
FIG. 11 is a schematic depiction of the so-called Generalized Maxwell or Maxwell-Weichert model for viscoelasticity, showing a spring element in parallel with as many spring-dashpot Maxwell model elements as are necessary to accurately represent a distribution.

The Generalized Maxwell model 140 (or Weichert model) is generally and schematically depicted in FIGS. 11 and 25, and is the most general form of the models described above. It takes into account that relaxation does not occur at a single time, but at a distribution of times. The varying time distribution is primarily due to molecular segments of different lengths whereby shorter segments contribute less than longer segments. Model 140 depicts this by including as many spring-dashpot elements (i.e. Maxwell model 110 elements) as are necessary to accurately represent the distribution.

From a further consideration of FIG. 25, it may be seen that a viscoelastic core medium has been depicted and referenced at 20 and that an elastic shell or casing medium has been depicted and referenced at 21. Whereas the casing medium 21 has been depicted as comprising or including springs 10 to represent its elastic nature, it will be noted that the viscoelastic core medium 20 comprises or includes all of the various schematic models 110, 120, 130, and 140 with its boundaries. It should be understood from an inspection of FIG. 25 that the models 110, 120, 130, and 140 as described hereinabove are not perfect models of viscoelastic behavior. All of the noted models have been included within the confines of medium 20 so as to represent that fact that the medium 20 is viscoelastic or exhibits viscoelastic behavior. The inclusion of all the models is meant to convey that no one single model (with any number of limitations) necessarily defines the medium 20. Rather, it should be understood that the models 110, 120, 130, and 140 are depicted so as to help describe or represent the nature of the viscoelastic core medium 20 just as the springs 10 help to describe or represent the nature of the casing medium 21.

Figure 12:
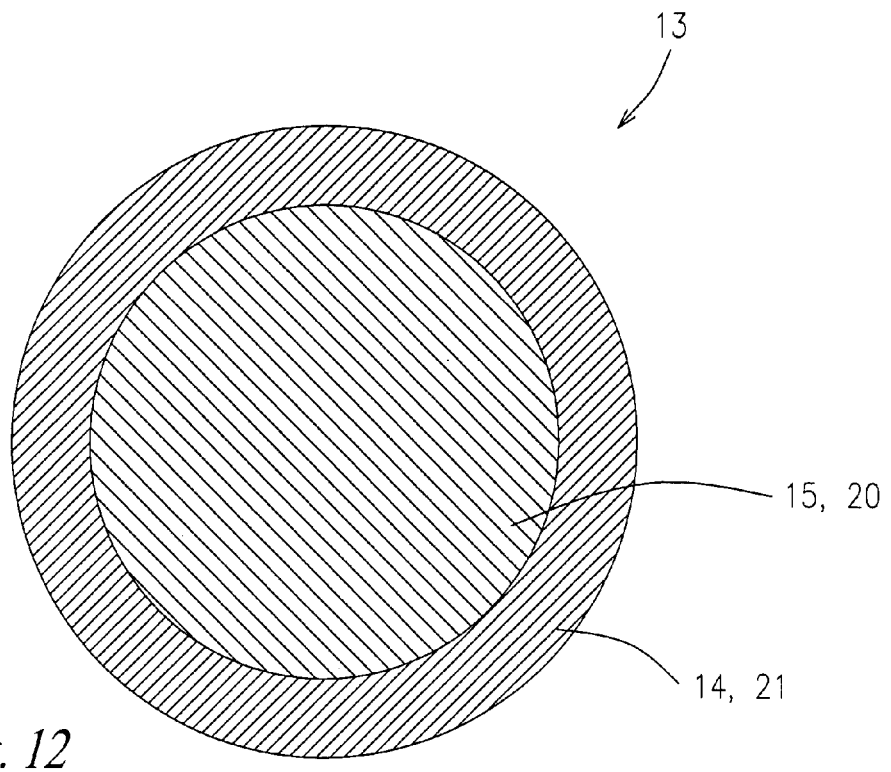
FIG. 12 is a cross-sectional view of a ball-like or spherical object in a relaxed state having a viscoelastic core or center and an elastic shell or casing.

Referring now to FIG. 12, the reader may consider an air-permeable ball-like structure or similar other spherical object 13 comprising an outer shell or casing as at 14, and an inner core or center filling as at 15. It is contemplated in this prefatory example that the outer shell or casing 14 of object 13 may be constructed from a substantially elastic material such as the casing medium 21, and that the inner core or filling 15 of object 13 may be constructed from a substantially viscoelastic material such as the core medium 20. Further, it is contemplated that the casing 14 is independent of the core 15 such that the inner boundary of the casing 14 is relatively free to move (disregarding interfacial friction) relative to the outer boundary of core 15 and vice versa, somewhat akin or analogous to the Earth's core movement relative to the Earth's crust.

Figure 13:
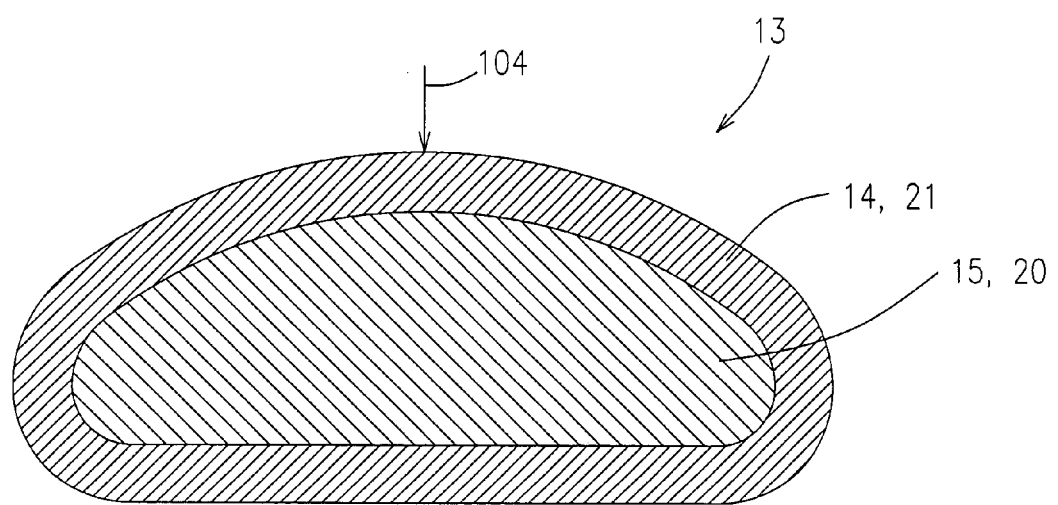
FIG. 13 is a cross-sectional view of the object otherwise depicted in FIG. 12 in a loaded or compressed state.
Figure 14:
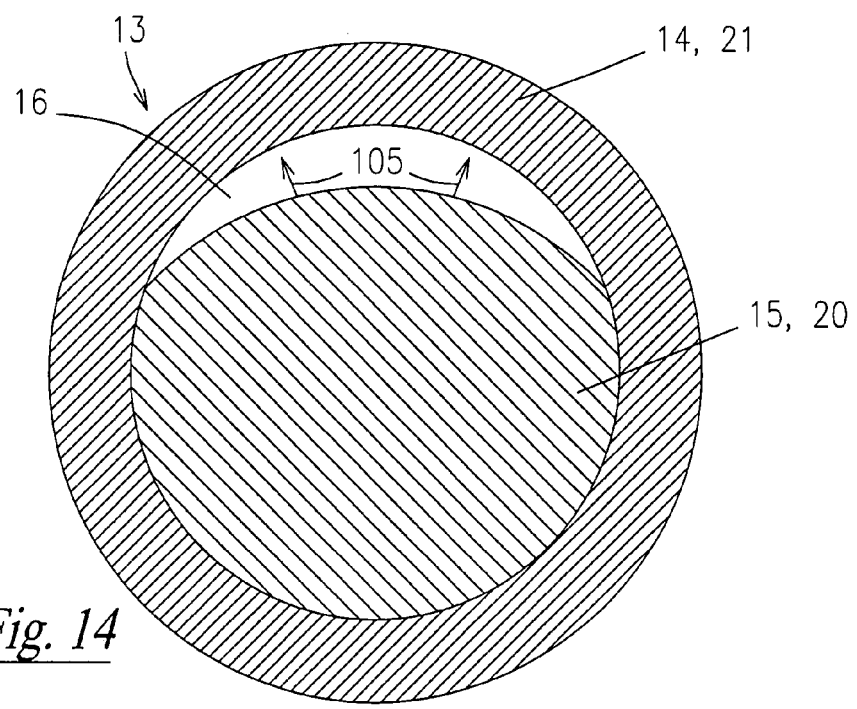
FIG. 14 is a cross-sectional view of the object otherwise depicted in FIG. 13 immediately following removal of the load depicting instantaneous return of the elastic casing and delayed return of the viscoelastic core.

If the object 13 were to be stressed, loaded, or "load-compressed" as generally depicted in FIG. 13 as at vector arrow 104, the elastic casing 14 and the viscoelastic core 15 will surely compress. However, the casing 14 will compress elastically and the core 15 will compress viscoelastically. In other words, the casing 14 will instantaneously compress and the core 15 will creep-compress. Upon release or removal of the stress or load 104, the casing 14 will elastically or instantaneously return and the core 15 will viscoelastically or creep-return to the original relaxed configuration as generally depicted in FIG. 14. In other words, the viscoelastic core medium 20 will exhibit a delayed return to the original relaxed configuration relative to the elastic casing medium 21 thereby forming a temporary air pocket 16, the volume of which may continually diminish as the core medium 20 creep-returns (as at vector arrows 105 in FIG. 14) to the original relaxed configuration otherwise generally depicted in FIG. 12.

Figure 15:
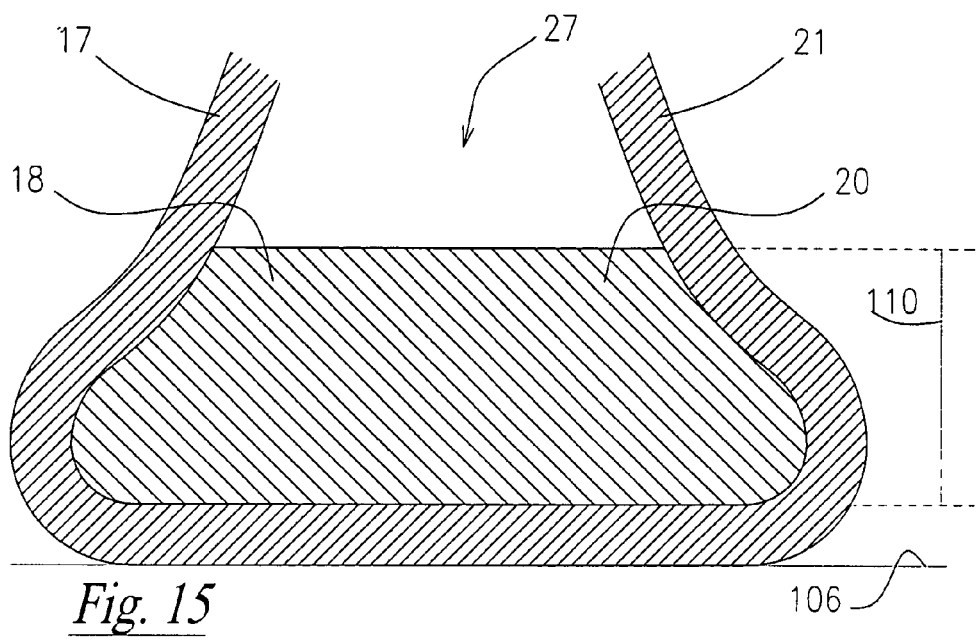
FIG. 15 is a cross-sectional view of a boot assembly comprising a pre-molded, bell-shaped elastic casing with a relaxed viscoelastic core received therein.

Suppose then, that the elastic casing 14 of the ball-like object 13 were to be ruptured at the top such that the core 15 were exposed, and objects could be inserted into the core cavity via the rupture or aperture otherwise formed in the casing 14 and used to compress the core 15 independent from the casing 14. Suppose further that the casing 14 were to be pre-molded into a bell-shaped casing 17 or skin instead of a ball-like shape, having an open top or mouth 27 as generally depicted in FIG. 15. The pre-molded bell-shaped casing 17 may thus receive and contain an impressionable core as at 18, which core 18 may comprise a substantially uniform top-to-bottom thickness instead of a spherical core (such as core 15). The core 18 could very well be constructed from the viscoelastic core medium 20 and the casing 17 could very well be constructed from the elastic casing medium 21 to form a boot assembly 19. This boot assembly 19 could then be attached to various objects, or otherwise outfitted upon those objects, for interfacing between the outfitted object and an underlying surface as at 106 in FIG. 15. This boot assembly 19 would thus provide an elastic casing 17 with a viscoelastic core 18 for providing a unique interfacial structure.

Figure 16:
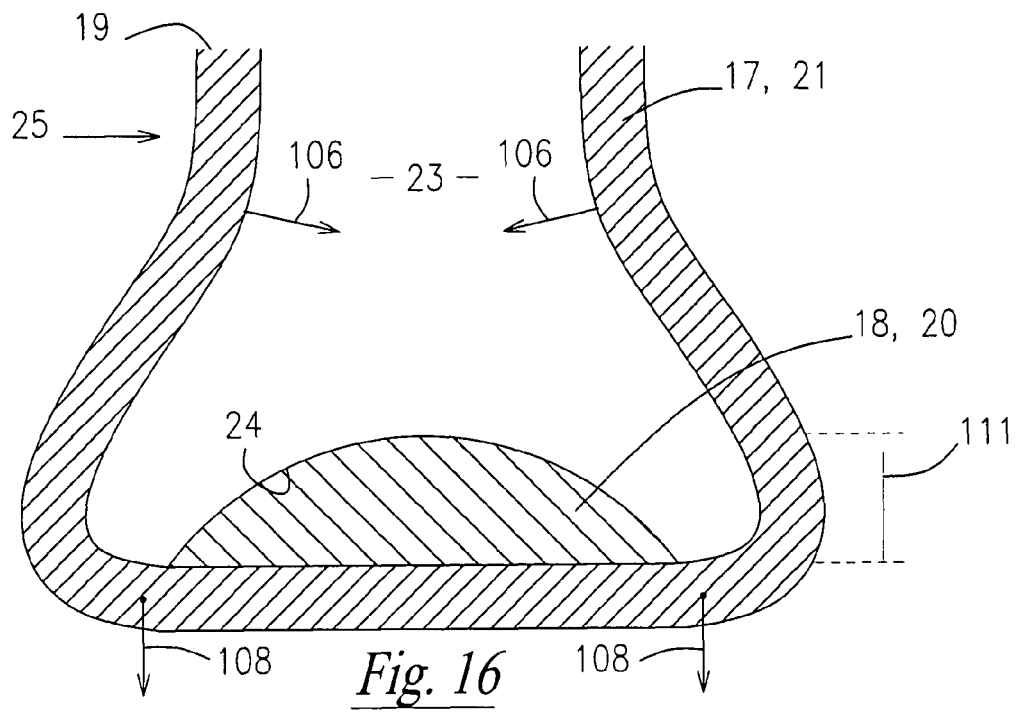
FIG. 16 is a cross-sectional view of the boot assembly otherwise depicted in FIG. 15 as outfitted upon a relaxed, non-rigid, bell-shaped or plunger-shaped structure, the viscoelastic core compressibly filling a solar cavity of the bell-shaped structure.

Referring now to FIG. 16, it may be seen that a non-rigid structure 23, generally having a bell-like or plunger-like shape with solar concavity (as at 24), could be outfitted with the boot assembly 19 such that the core 18, being compressed by the concave surface, would compressibly fill the volume defined or bound by the solar concavity 24 as generally depicted. Further, the bell-shaped casing 17, being constructed from elastic, would well function to retain the casing 17 in outfitted relation about the structure 23, since the restoring forces inherent in the material would be directed against the outer surface of the structure 23 if one were to attempt to remove the boot assembly 19 by imparting a downward force(s) (as at 108) thereupon. In other words, in addition to the frictional forces that would operate to thwart removal of the boot assembly 19 from the structure 23, the elastic material at the neck 25 of the boot assembly 19 would impart centrally-directed restoring forces (as at 106) which forces 106 could well function to retain the boot assembly 19 in outfitted relation upon the structure 23.

Figure 17:
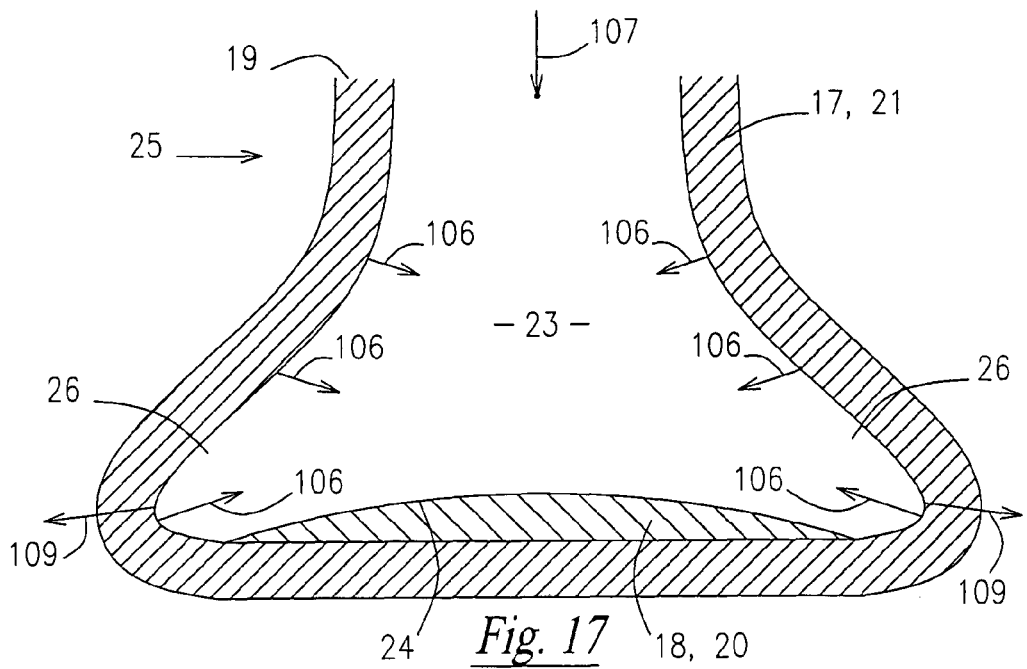
FIG. 17 is a cross-sectional view of the boot assembly and outfitted structure otherwise depicted in FIG. 16, the non-rigid, bell-shaped structure being loaded thereby expanding the elastic casing and compressing the viscoelastic core.

If the outfitted, non-rigid structure 23 were stressed, loaded, or load-compressed as at 107 in FIG. 17, the non-rigid structure 23 may compress toward the solar concavity 24, flattening same (or increasing the radius of curvature thereof), and expanding the walls 26 radially outward as at vectors 109. During loading, then, the elastic casing 17 would elastically react to the structural dilation (and compression) and the viscoelastic core 18 would viscoelastically react to the structural compression. In other words, the casing 17 would exhibit spring-like restoring forces 106 opposite the casing displacement(s) as imparted thereagainst via the expanding walls 26. Further, the viscoelastic core 18 would creep-compress from the initial back-stressed core configuration generally depicted in FIG. 16 to a second back-stressed core configuration as generally depicted in FIG. 17.

In this last regard, it will be recalled that the relaxed original core configuration may have a substantially uniform top-to-bottom thickness as at 110 in FIG. 15. This thickness 110 is akin to the thickness 34 as referenced in published U.S. Patent Application Publication No. 2007/0039289 (the '289 publication) of which this application claims the benefit. Further, it may be noted that the solar concavity 24 of the non-rigid structure 23 has a maximal cavity depth as referenced at 111 in FIG. 16. The maximal cavity depth 111 is further akin to the maximal cavity depth referenced in the '289 publication.

Notably, the maximal cavity depth 111 is lesser in magnitude than the thickness 110 such that when the structure 23 seats down upon the core 18, the core 18 is creep-compressed so as to load back stress(es) into the viscoelastic medium 20 and to completely fill or occupy the volume defined by the solar concavity 24. This last point is a key point. The core 18 completely fills the volume defined by the solar concavity 24 during the initial impressionable core compression generally depicted in FIG. 16. It will be further recalled that when the back stress is the same magnitude as the applied stress in a polymeric viscoelastic material, the material no longer creeps. When the original stress or load is removed, the accumulated back stresses will cause the material to return to its original form or relaxed original core configuration generally depicted in FIG. 15.

Figure 18:
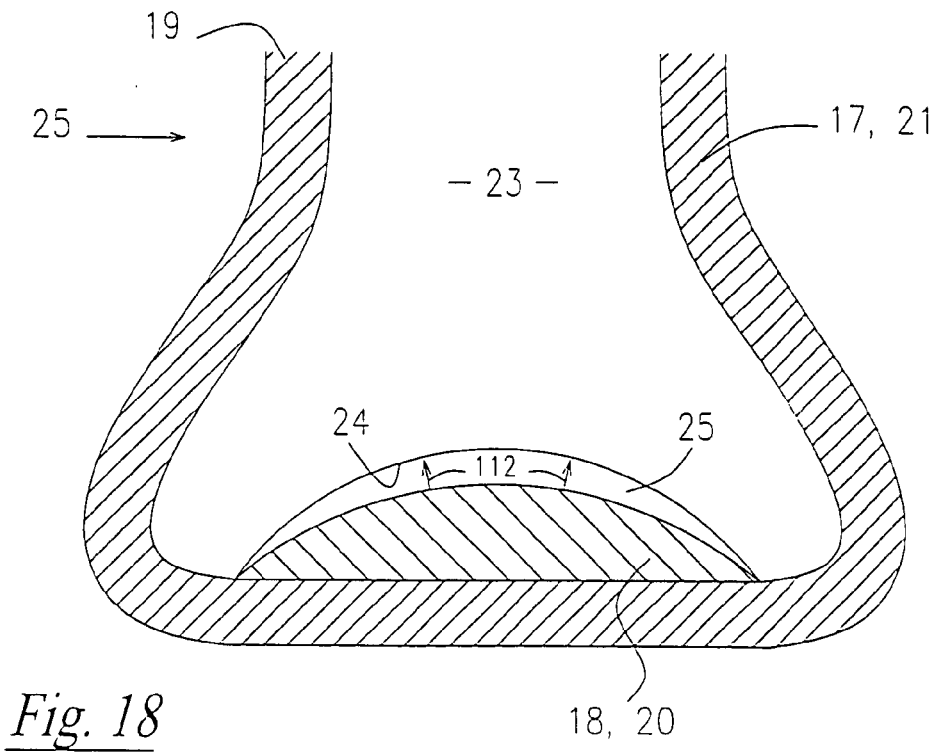
FIG. 18 is a cross-sectional view of the boot assembly and outfitted structure otherwise depicted in FIG. 17 immediately following removal of the load depicting instantaneous return of the elastic casing and outfitted structure, and delayed return of the viscoelastic core.

As earlier stated, a second back-stressed core configuration is depicted in FIG. 17, which figure depicts loading of the non-rigid structure 23. As the load 107 is removed, the restoring forces 106 and (any inherent restoring forces within structure 23) instantaneously return the casing 17 and the structure 23 to the original relaxed structural configuration(s) generally depicted in FIGS. 16 and 18. The back stresses in the second back-stressed core configuration, however, creep-return (as at arrows 112) the viscoelastic core 18 to the initial back-stressed core configuration at a delayed rate relative to the elastic return of the casing 17 and structure 23. The delayed return enabled via creep of the core 18 provides a temporary void, cavity or pocket as at 25 in FIG. 18. The volume of the pocket 25 gradually diminishes as the core 18 creep-returns to the initial back stressed core configuration.

Figure 19:
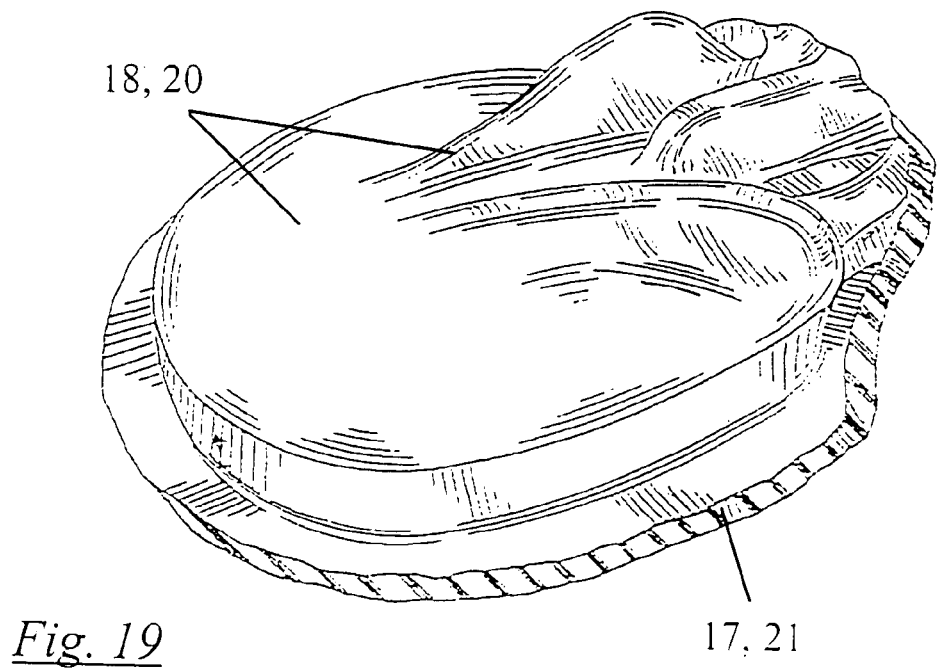
FIG. 19 is a perspective view of a negative impression of an equine hoof cavity or sole/frog cavity depicting the complex anatomical contour thereof.
Figure 20:
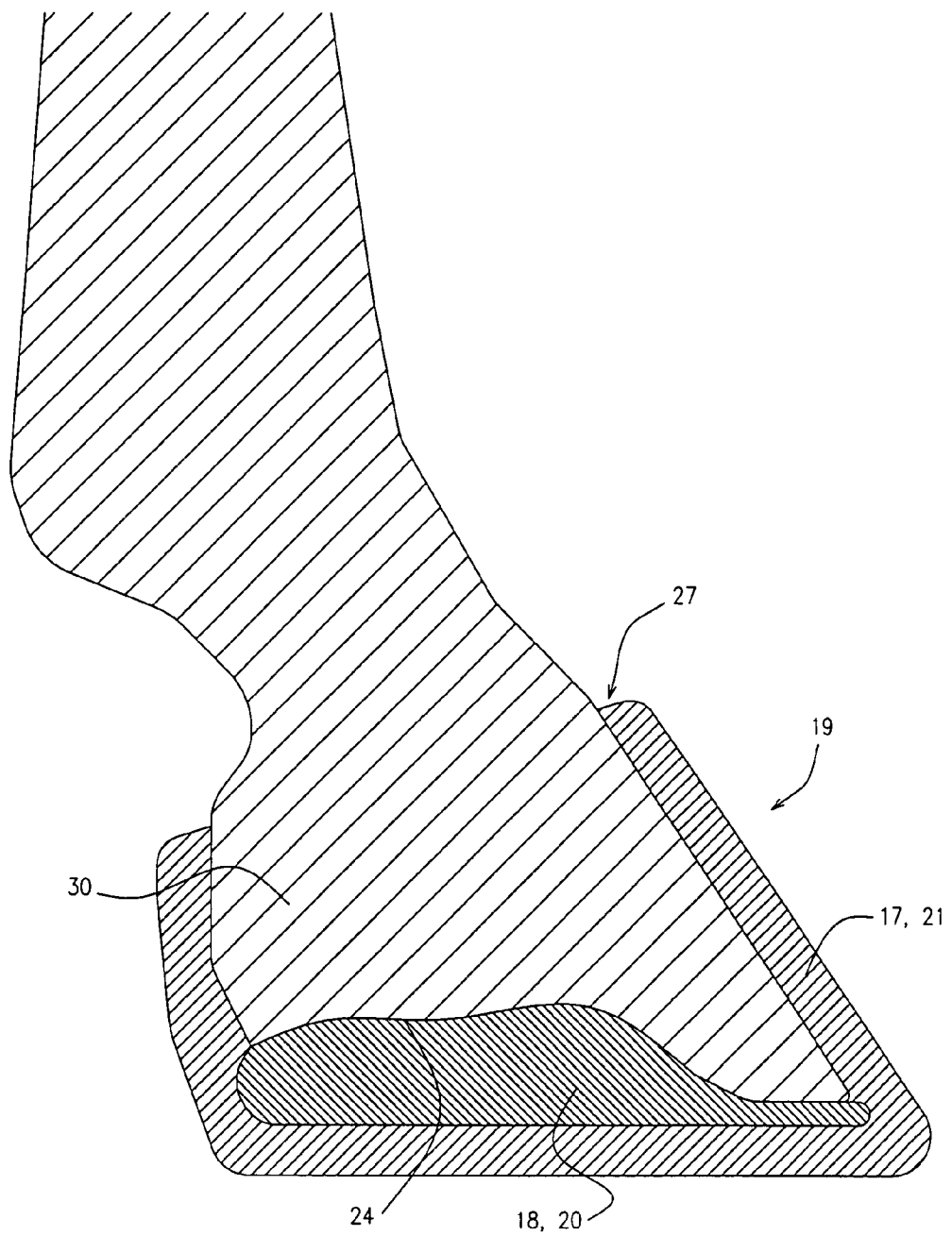
FIG. 20 is a parasagital cross-sectional view of an equine hoof outfitted with the boot assembly of the present invention showing a variable depth sole/frog cavity filled with a back-stressed, compressed viscoelastic core.
Figure 21:
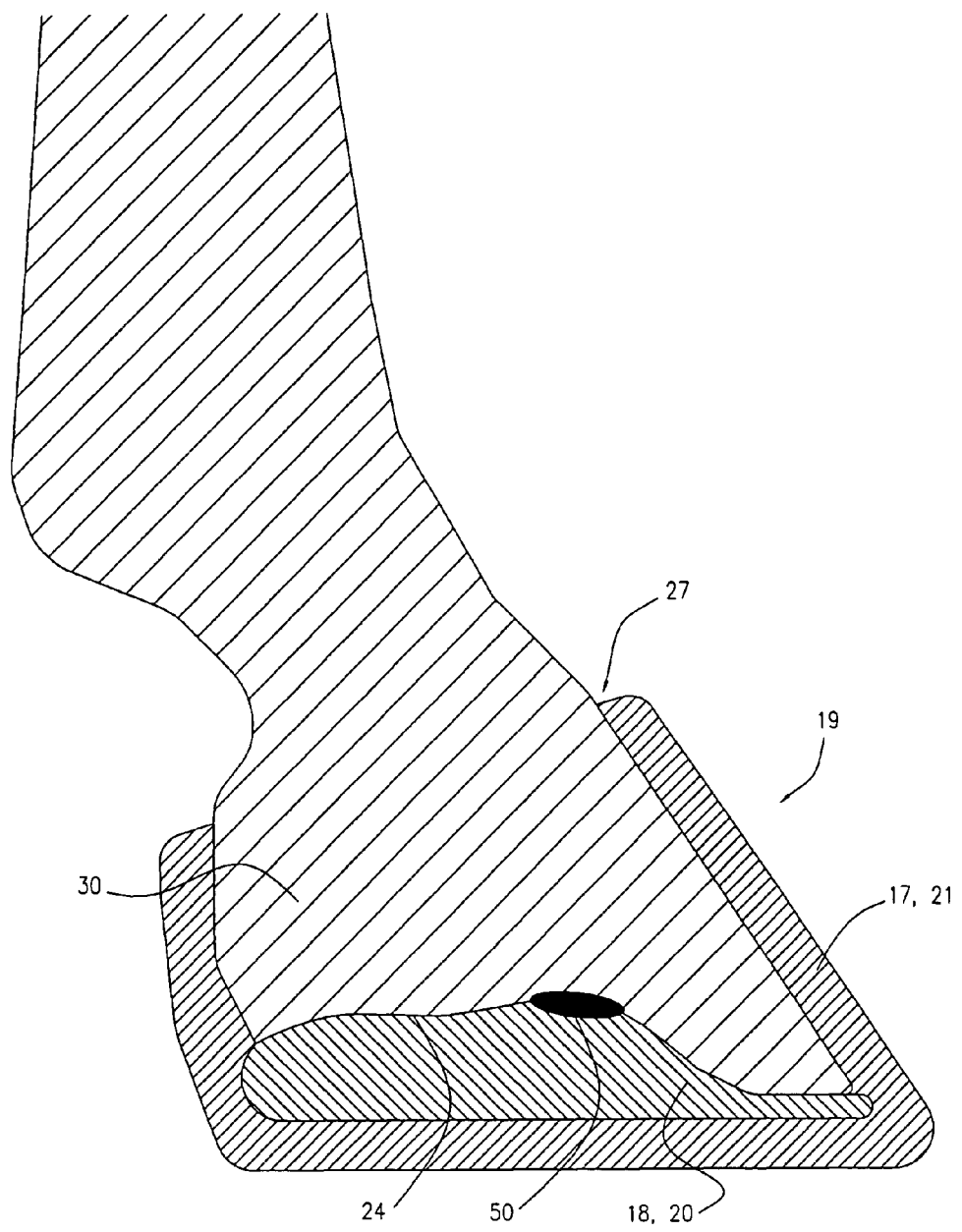
FIG. 21 is a parasagital cross-sectional view of the outfitted equine hoof otherwise depicted in FIG. 20 having a target treatment site.

It is believed that the non-rigid, roughly bell-shaped or plunger-shaped structure 23 is a fair model of an equine hoof 30 and that the boot assembly 19 may be pre-molded to receive, or be otherwise donned upon, an equine hoof 30 as generally depicted in FIGS. 20-24. It will be recalled that an equine hoof is not a rigid structure, but elastic and flexible. When loaded during a step under the weight of an animal, the hoof physiologically changes its shape. This results from the solar concavity 24, which has a complexly contoured and variable depth as generally depicted in the noted figures. Further, the reader is directed to FIG. 19, which figure is a perspective view of a negative impression of a hoof cavity or sole/frog cavity as discussed in more detail in the '289 publication. It may be readily seen from an inspection of the noted figure, that the negative impression of the hoof cavity is anatomically complex.

A creep-compressible and thus impressionable, cavity-filling core medium such as core medium 20 exhibits superior results for purposes of the present invention as compared to plastic foam inserts, fastening hardware, and/or inlays such as those that might be taught by U.S. Pat. No. 5,983,611 ('611 patent), which issued to Smahl et al. Perhaps most importantly, the core medium 20 of core 18 is creep-compressible and creep-returnable so that the cavity-filling behavior of the core 18 is dynamic and ever-changing during repeated loading cycles. The prior art appears to be silent on this feature, and thus means for embracing and therapeutically treating the dynamic hoof structure during a loading cycle, as embodied by the present invention, are warranted.

Figure 22:
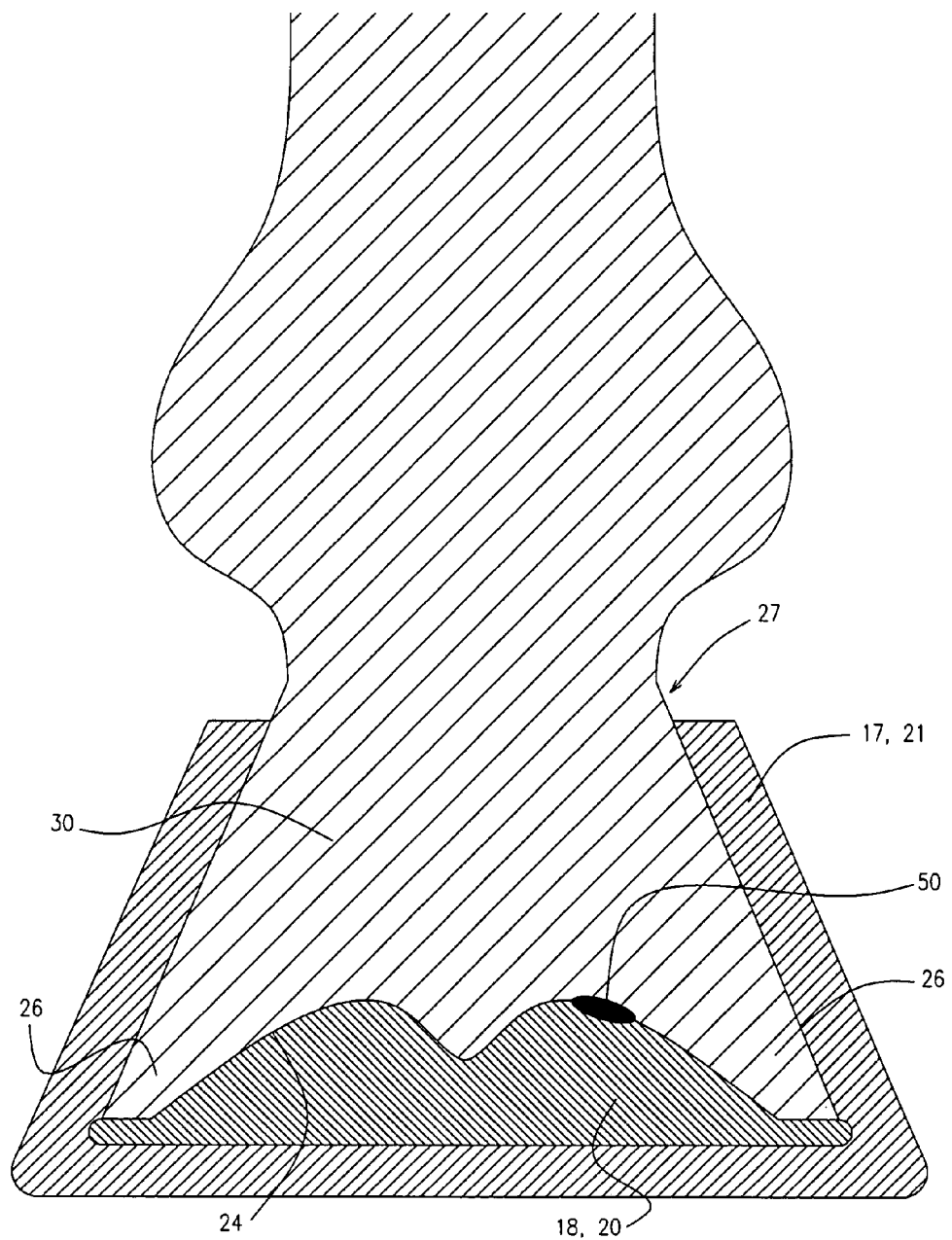
FIG. 22 is a lateral cross-sectional view of the outfitted equine hoof otherwise depicted in FIG. 21 as sectioned through the target treatment site, depicting the hoof in an unloaded, contracted state.
Figure 23:
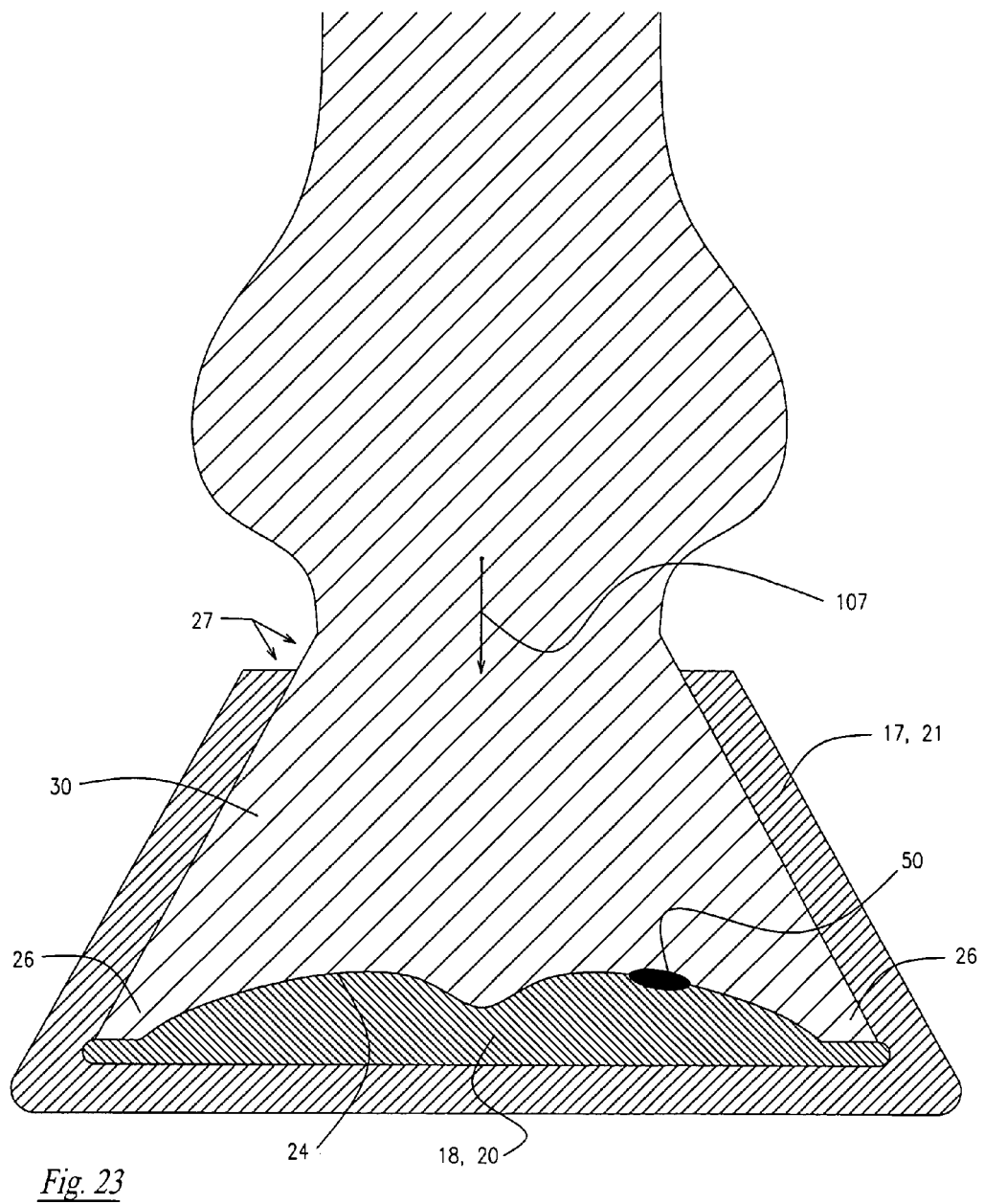
FIG. 23 is a lateral cross-sectional view of the outfitted equine hoof otherwise depicted in FIG. 22 depicting the hoof in a loaded, dilated state.
Figure 24:
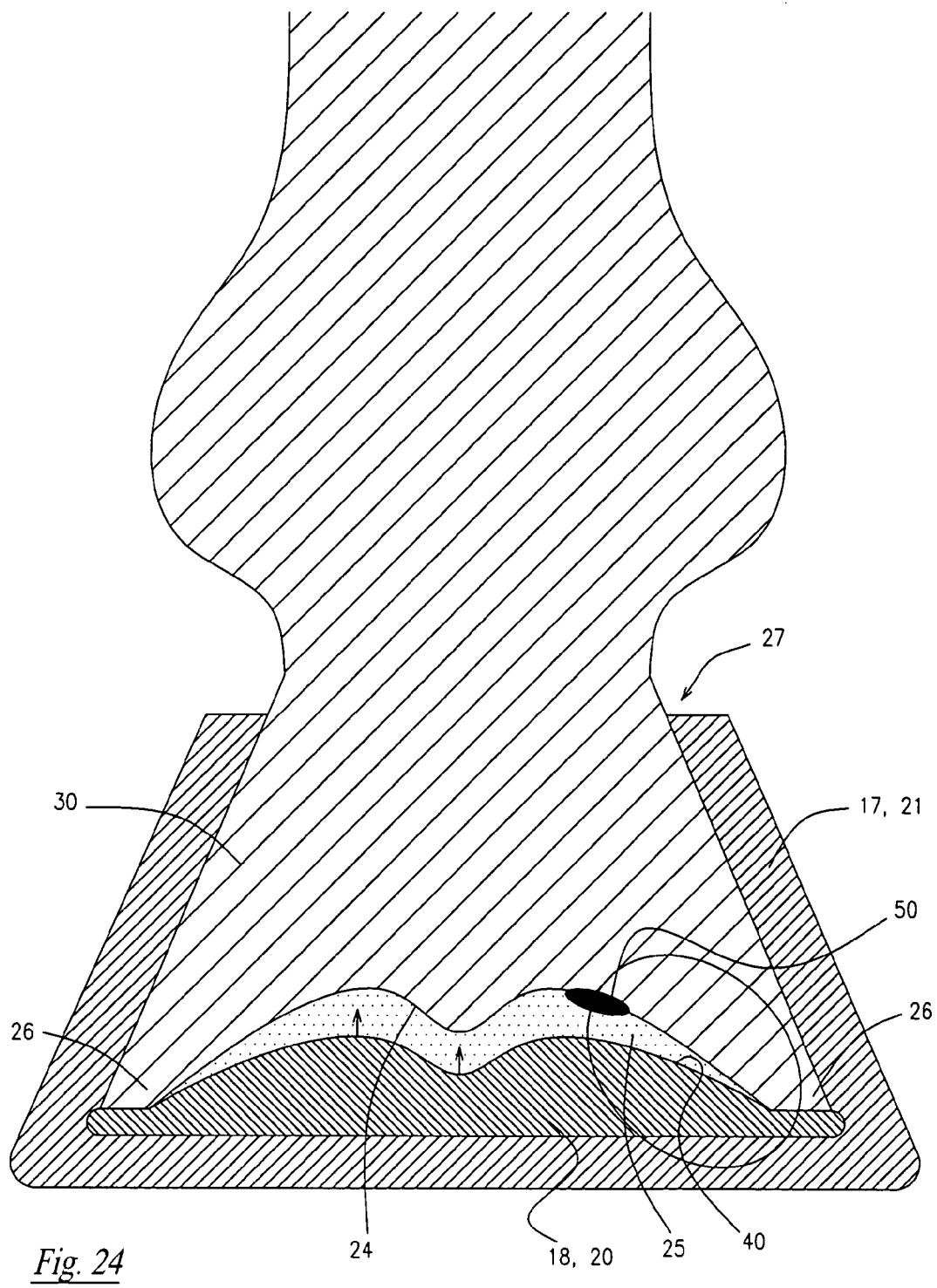
FIG. 24 is a lateral cross-sectional view of the outfitted equine hoof otherwise depicted in FIG. 23 immediately following removal of the load depicting instantaneous return of the elastic casing and equine hoof, and delayed return of the viscoelastic core.

In this last regard, it will be recalled that the shape changes in a loaded hoof are complex. The plantar arch flattens, the solar concavity 24 decreases in depth, the heels spread, and the overall hoof diameter increases to a "dilated" configuration (as generally depicted in FIG. 23). When unloaded, the hoof 30 restores its "contracted" configuration as generally depicted in FIGS. 22 and 24. During hoof contraction, the blood pressure in the hoof 30 raises and blood is squeezed out. The evolutionarily developed hoof mechanism thus ensures an effective blood circulation into and out of the hoof 30 for ensuring hoof health.

The hoof boot or boot assembly 19 of the present invention is thus designed for treating a hoof 30 so as therapeutically react to the evolutionarily developed loading/unloading cycle of the hoof, and to prevent disruption of the complex shape changes that occur during said cycle. Notably, it does not place relatively rigid, volume-occupying inlays into the hoof cavity or attach itself to the hoof 30 via relatively rigid fastening hardware, all of which may be viewed as disruptive to the normal loading-unloading cycle of the hoof 30 and thus generally disruptive to hoof health by handicapping effective blood circulation.

As earlier noted, it is not uncommon for an equine to develop an abscess 50 on any of its hooves as generally depicted in FIGS. 21-25. Common state of the art methods for remedying hoof abscesses 50 include drilling a hole into the hoof 30 followed by packing the hole and soaking the hoof 30. To soak a horse hoof, farriers often recommend that horse caretakers purchase any number of hoof-soaking boots, such as the so-called "EZ" brand boot or the DAVIS brand boot. The primary problem with these types of boots is that they often irritate the coronary band, the growing band of the hoof. Horses then often develop a secondary infection, which secondary infection then requires further treatment(s).

An abscess 50 is essentially a collection of pus that has accumulated in a cavity formed by the tissue on the basis of an infectious process usually caused by bacteria or parasites, which may result from standing in feces-laden mud, for example. The organisms or foreign materials gain access to a part of tissue and kill the local cells, resulting in the release of toxins. The toxins trigger an inflammatory response (i.e. a natural healing response) which draws huge amounts of white blood cells to the area and increases the regional blood flow. The final structure of the abscess 50 is an abscess wall that is formed by the adjacent healthy cells in an attempt to build a barrier around the pus that limits the infected material from neighboring structures and also limits immune cells from attacking the bacteria.

The hoof boot or boot assembly 19 of the present invention provides a protective, interfacial barrier intermediate the equine hoof 30 and the underlying surface as at 106 so as to prevent further bacteria from gaining access to the hoof. Further, the assembly 19 operates to enhance the natural blood-pumping action during cyclic hoof loading/unloading by ensuring proper hood contraction. Effective blood flow, it will be noted from above, is central to the healing process. By shielding the hoof 30 and enhancing blood flow therein, the boot assembly 19 not only protects the hoof 30 from further infection or contamination, but functions to aid the natural pumping action of the hoof 30. Further, the core 18 minimizes frictional contact time with the target treatment site (such as an abscess 50) via creep-compression and creep-return of the medium 20 in response to loading/unloading of the soft cavity-defining tissue.

In this last regard, it should be noted that the hoof boot 19 may receive certain topical medicaments 40 as generally depicted in FIG. 25. The medicament 40 may be received or otherwise applied to the core medium 20 for treating an injury, infection, or other targeted treatment site or area. As noted in the '289 publication, exemplary medicaments 40 may comprise any number of homeopathic treatment solutions (such as a vinegar and water solution), HOOF HEAL brand solution, THRUSH BUSTER brand solution, FORSCHNER'S brand hoof pack agent or similar other hoof pack agents for topically treating a select equine hoof disorder. It is further contemplated that the medicament 40 may comprise a volatile ingredient 41 such as an alcohol, which volatile ingredient 41 is readily vaporizable into the void, cavity, or pocket 25 for forming an ambient therapeutic environment in superficial adjacency to the targeted treatment site as exemplified by the abscess 50 in FIGS. 21-25.

The hoof boot 19 or equine hoof boot assembly of the present invention may well function as a hoof treatment aid, and to this end preferably comprise an outer hoof-encasing or hoof-enveloping casing 17, an inner cavity-filling core 18, and a medicament 40. The casing 17 may be preferably constructed from an elastic material or casing medium 21, such as rubber, and the core 18 may be preferably constructed from a viscoelastic material or core medium 20, which core medium 20 is received within the casing medium 21 as generally depicted in FIGS. 15-18 and 20-24. The medicament 40 may be absorbed, applied to, or otherwise received by the core 18 and dispensable therefrom via load-compression or weight-compression of the core 18.

The boot assembly 19 is outfittable upon an equine hoof 30 such that the casing 17 encases or envelopes the equine hoof 30, the core 18 compressibly fills the hoof cavity bound by the solar concavity 24, and the medicament 40 topically treats a select cavity structure of the hoof cavity 30, such as an abscess 50 or similar other treatment target. The casing 17 is elastically actuable, the core is viscoelastically compressible, and the medicament 40 is dispensable from, or applicable by, the core 18 for topically treating the treatment target during load compression and dilation of the outfitted equine hoof 30 as generally depicted in FIG. 23. Further, the casing 17 is elastically returnable, the core 18 is creep-returnable (as at 112) during unloading or contraction of the equine hoof 30 as generally depicted in FIG. 24.

The medicament 40 is exposed to the pocket 25 when the cavity-filling core 18 is creep-returned (as at 112) to the initial back-stressed cavity-filling configuration. The elastically returnable casing 17 effectively ensures effective return of the equine hoof 30 to a relaxed or contracted hoof configuration as generally depicted in FIG. 24 during weight removal from, or unloading of, the equine hoof 30.

In contrast to the elastically aided and/or instantaneous return to the relaxed or contracted hoof configuration during unloading via the casing 17, the core 18 exhibits a relatively delayed cavity-filling creep return. The delayed cavity-filling creep return may well function to maximize exposure time of the target treatment site to the ambient therapeutic environment enabled by way of the medicament 40, ingredient 41, and pocket 25; and minimizes contact time with the targeted treatment structure or site for reducing or minimizing frictional irritation thereof.

While the above description contains much specificity, this specificity should not be construed as limitations on the scope of the invention, but rather as an exemplification of the invention. For example, as is described hereinabove, it is contemplated that the present invention essentially discloses a hoof boot 19 for protecting and treating a hoof 30, which boot 19 comprises an elastic core-containing casing such as casing 17 and a viscoelastic cavity-filling core such as core 18.

The casing 17 comprises a hoof-receiving mouth as at 27 and a dynamic core-receiving volume, which may be best exemplified in FIG. 15 by core/medium 18/20. The core 18 is received within the dynamic core-receiving volume, and the casing 17 is outfittable upon a hoof 30 via the mouth 27 such that the casing 17 envelopes the hoof 30 and the core 18 negatively impresses a hoof cavity as defined by the solar concavity 24. The casing 17 is elastically actuable and the core 18 is viscoelastically or creep-compressible during weight compression of the outfitted hoof 30. Further, the casing 17 is elastically returnable and the core 18 is creep-returnable during weight removal from, or unloading of, the hoof 30. The hoof boot 19 thus treats an outfitted hoof 30.

Stated another way, the hoof boot 19 essentially functions to outfit a hoof 30, and comprises an elastic skin such as casing 17 and a viscoelastic core such as core 18. The skin comprises a hoof-receiving mouth (as at 27) and a hoof-receiving volume. The core is received within the hoof-receiving volume, and the skin is outfittable upon a hoof 30 via the mouth 27. The skin thereby encases the hoof 30 and the core compressibly and negatively impresses the hoof cavity. The skin is naturally elastically actuable and the core is creep-compressible during load compression of the outfitted hoof. Further, the skin is elastically returnable and the core is creep-returnable during unloading of the outfitted hoof.

Accordingly, although the invention has been described by reference to a preferred embodiment, it is not intended that the novel boot assembly be limited thereby, but that modifications thereof are intended to be included as falling within the broad scope and spirit of the foregoing disclosure, the following claims and the appended drawings.

I claim:

1. A hoof boot assembly, the hoof boot assembly for treating a hoof, the hoof boot assembly comprising:
    an outer hoof-enveloping casing, the casing being constructed from an elastic material, the elastic material being of uniform, integral material construction and comprising a relaxed casing state;
    an inner cavity-filling core, the core being received within the casing, the core being constructed from a viscoelastic material, the core having upper and lower core surfaces, a uniform relaxed core thickness intermediate the upper and lower core surfaces, and a uniform, horseshoe-shaped area perpendicular to the core thickness, the core thus having a relaxed core volume defined by the product of the core thickness and the horseshoe-shaped area; and
    a medicament, the medicament being pre-applied to the upper core surface of the core and deliverable therefrom to a target treatment site via viscoelastically back-stressing the core to a third core volume lesser in magnitude relative to the second core volume, the boot assembly being outfittable upon a hoof such that the casing envelopes the hoof in a first actuated casing state, the core compressibly fills a hoof cavity thereof in a first compressed core state, and the medicament topically treats the target treatment site, the casing being elastically actuable to a second actuable casing state and the core being creep-compressible to a second compressed core state during hoof loading, the casing being elastically returnable to the first actuated casing state and the core being creep-returnable to the first compressed core state during hoof unloading, the hoof boot assembly thus for treating the outfitted hoof.

2. The hoof boot assembly of claim 1 wherein the creep-returnable core effects a diminishing pocket as the core creep-returns to a cavity filling configuration, the medicament being exposed to the diminishing pocket.

3. The hoof boot assembly of claim 2 wherein the medicament comprises a volatile ingredient, the volatile ingredient being readily vaporizable into the diminishing pocket for forming an ambient therapeutic environment relative to the target treatment site.

4. The hoof boot assembly of claim 3 wherein the creep-returnable, cavity-filling core and the diminishing pocket function to maximize target treatment site exposure time to the ambient therapeutic environment.

5. The hoof boot assembly of claim 4 wherein the creep-returnable, cavity-filling core and the diminishing pocket minimize material contact time with the target treatment site, the minimized material contact time for reducing frictional irritation of the target treatment site.

6. The hoof boot assembly of claim 1 wherein the elastically returnable casing ensures return of the hoof to a contracted hoof configuration during hoof unloading, the contracted hoof configuration for raising blood pressure within the hoof thereby promoting circulation within the hoof.

7. A hoof boot for protecting and treating a hoof, the hoof boot comprising:
    an elastic, core-containing casing, the casing comprising a hoof-receiving mouth and a dynamic core-receiving volume, the casing being of uniform, integral material construction and comprising a relaxed casing state; and
    a viscoelastic, cavity-filling core, the core having upper and lower core surfaces, a uniform relaxed core thickness intermediate the upper and lower core surfaces, and a uniform, horseshoe-shaped area perpendicular to the core thickness, the core thus having a relaxed core volume defined by the product of the core thickness and the horseshoe-shaped area, the core being received within the core-receiving volume, the casing being outfittable upon a hoof via the mouth such that the casing elastically envelopes the hoof in a second casing state, the relaxed core volume is reduced to a second core volume, and the upper core surface negatively impresses a hoof cavity, the casing being elastically actuable to a third casing state and the core being creep-compressible to a third core volume during hoof loading, the casing being elastically returnable to the second casing state and the core being creep-returnable the second core volume during hoof unloading, the hoof boot thus for protecting and treating an outfitted hoof.

8. The hoof boot of claim 7 wherein a medicament is deliverable to a target treatment site of the hoof cavity via core compression for topically treating said target treatment site.

9. The hoof boot of claim 8 wherein the creep-returnable core effects a volume-diminishing pocket as the core creep-returns to a negative impression of the hoof cavity, the medicament being exposed to the volume-diminishing pocket.

10. The hoof boot of claim 9 wherein the medicament comprises a volatile ingredient, the volatile ingredient being readily vaporizable into the volume-diminishing pocket for forming an ambient therapeutic environment relative to the target treatment site.

11. The hoof boot of claim 10 wherein the creep-returnable core and the volume-diminishing pocket function to maximize target treatment site exposure time to the ambient therapeutic environment.

12. The hoof boot assembly of claim 9 wherein the creep-returnable core minimizes material contact time with the target treatment site, the minimized material contact time for reducing frictional irritation of the target treatment site.

13. The hoof boot assembly of claim 7 wherein the elastically returnable casing ensures return of the hoof to a contracted hoof configuration during hoof unloading, the contracted hoof configuration for raising blood pressure within the hoof thereby promoting circulation within the hoof.

14. A hoof boot for outfitting a hoof, the hoof boot comprising:
   an elastic skin, the skin comprising a hoof-receiving mouth and a hoof-receiving volume, the skin being of uniform, integral material construction and comprising a relaxed skin state; and
   a viscoelastic core, the core having upper and lower core surfaces, a uniform relaxed core thickness intermediate the upper and lower core surfaces, and a uniform, horseshoe-shaped area perpendicular to the core thickness, the core thus having a relaxed core volume defined by the product of the core thickness and the horseshoe-shaped area, the core being received within the hoof-receiving volume, the skin being outfittable upon a hoof via the mouth, the skin thereby encasing the hoof in a second actuated casing state, the relaxed core volume being reduced to a second core volume, and the upper core surface negatively impressing a hoof cavity, the skin being elastically actuable to a third skin state and the core being creep-compressible to a third core volume during hoof loading, the skin being elastically returnable to the second skin state and the core being creep-returnable to the second core volume during hoof unloading.

15. The hoof boot of claim 14 wherein a medicament is deliverable to a target treatment site of the hoof cavity via core compression for topically treating said site.

16. The hoof boot of claim 15 wherein the medicament is exposed to a volume-diminishing pocket, the volume-diminishing pocket being formed as the core creep-returns to a negative impression of the hoof cavity.

17. The hoof boot of claim 16 wherein the medicament comprises a volatile ingredient, the volatile ingredient being readily vaporizable into the volume-diminishing pocket for forming an ambient therapeutic environment relative to the target treatment site.

18. The hoof boot of claim 17 wherein the creep-returnable core and the volume-diminishing pocket function to maximize target treatment site exposure time to the ambient therapeutic environment.

19. The hoof boot assembly of claim 14 wherein the creep-returnable core minimizes material contact time with the target treatment site, the minimized material contact time for reducing frictional irritation of the target treatment site.

20. The hoof boot assembly of claim 14 wherein the elastically returnable skin ensures return of the hoof to a contracted hoof configuration during hoof unloading, the contracted hoof configuration for raising blood pressure within the hoof thereby promoting circulation within the hoof.

* * * * *